(12) United States Patent
L'Heureux et al.

(10) Patent No.: US 11,405,101 B2
(45) Date of Patent: *Aug. 2, 2022

(54) OTDR RECEIVE DEVICE WITH CONNECTIVITY FEEDBACK

(71) Applicant: EXFO Inc., Quebec (CA)

(72) Inventors: Mario L'Heureux, Levis (CA); Stephane Perron, Quebec (CA)

(73) Assignee: EXFO Inc., Quebec (CA)

( * ) Notice: Subject to any disclaimer, the term of this patent is extended or adjusted under 35 U.S.C. 154(b) by 33 days.

This patent is subject to a terminal disclaimer.

(21) Appl. No.: 17/088,157

(22) Filed: Nov. 3, 2020

(65) Prior Publication Data
US 2021/0135752 A1 May 6, 2021

Related U.S. Application Data

(63) Continuation of application No. 16/510,396, filed on Jul. 12, 2019, now Pat. No. 10,862,582.

(Continued)

(51) Int. Cl.
| | |
|---|---|
| *H04B 10/071* | (2013.01) |
| *H04B 10/035* | (2013.01) |
| *G01D 5/353* | (2006.01) |
| *H05B 45/22* | (2020.01) |
| *G01M 11/00* | (2006.01) |
| *H05B 45/20* | (2020.01) |

(52) U.S. Cl.
CPC ....... *H04B 10/071* (2013.01); *G01D 5/35358* (2013.01); *G01M 11/3118* (2013.01); *H04B 10/035* (2013.01); *H05B 45/20* (2020.01); *H05B 45/22* (2020.01)

(58) Field of Classification Search
CPC combination set(s) only.
See application file for complete search history.

(56) References Cited

U.S. PATENT DOCUMENTS

| | | |
|---|---|---|
| 4,673,291 A | 6/1987 | Heckmann |
| 4,726,676 A | 2/1988 | Maslaney et al. |

(Continued)

OTHER PUBLICATIONS

Tabi Fouda Bernard Marie,"Principle and Application State of Fully Distributed Fiber Optic Vibration Detection Technology Based on Φ-OTDR: A Review," Aug. 1, 2021, IEEE Sensors Journal, vol. 21, No. 15,pp. 16428-16439.*

(Continued)

*Primary Examiner* — Omar S Ismail
(74) *Attorney, Agent, or Firm* — Helene Chotard

(57) ABSTRACT

There is provided an OTDR receive device and an OTDR system comprising an OTDR receive device wherein the OTDR unit and the OTDR receive device are to be connected at opposite ends of an optical fiber link under test. The OTDR receive device comprises means for the OTDR system to detect an established connectivity between the OTDR unit and the OTDR receive device via the optical fiber link under test and a status indicator to notify a user of the receive device of the connectivity status and optionally an OTDR measurement status. Connectivity detection allows to check for continuity between the OTDR unit and the OTDR receive device before launching an OTDR measurement. A user of the OTDR unit does not need to communicate with the user of the OTDR receive device to know when to start the acquisition.

18 Claims, 14 Drawing Sheets

Related U.S. Application Data

(60) Provisional application No. 62/818,800, filed on Mar. 15, 2019, provisional application No. 62/791,406, filed on Jan. 11, 2019, provisional application No. 62/713,015, filed on Aug. 1, 2018.

(56) References Cited

U.S. PATENT DOCUMENTS

| | | | |
|---|---|---|---|
| 5,305,078 | A | 4/1994 | Lamonde |
| 5,455,672 | A | 10/1995 | Lamonde et al. |
| 5,559,624 | A * | 9/1996 | Darcie ............... H04J 14/02 398/72 |
| 5,592,284 | A | 1/1997 | Bédard |
| 7,515,276 | B2 | 4/2009 | Froggatt et al. |
| 7,808,621 | B2 | 10/2010 | Russell |
| 8,482,725 | B2 | 6/2013 | Perron et al. |
| 8,711,341 | B2 | 4/2014 | Blair et al. |
| 9,143,236 | B1 * | 9/2015 | Bartur ............... H04B 10/504 |
| 9,184,833 | B2 | 11/2015 | Kassler |
| 9,435,713 | B2 | 9/2016 | Collier et al. |
| 9,709,460 | B2 | 7/2017 | Leblanc et al. |
| 2005/0152700 | A1 * | 7/2005 | Fling ............... H04B 10/071 398/135 |
| 2006/0198634 | A1 * | 9/2006 | Ofalt ............... H04L 43/50 398/16 |
| 2009/0268197 | A1 * | 10/2009 | Perron ............... G01M 11/3136 356/73.1 |
| 2011/0173315 | A1 * | 7/2011 | Aguren ............... H04L 63/16 709/224 |
| 2012/0020672 | A1 * | 1/2012 | Aguren ............... G01M 11/3154 398/139 |
| 2014/0072306 | A1 * | 3/2014 | Sridhar ............... H04B 10/071 398/16 |
| 2014/0198311 | A1 * | 7/2014 | L'Heureux ......... G01M 11/3118 356/73.1 |
| 2015/0062562 | A1 * | 3/2015 | Kassler ............... G01M 11/3136 356/73.1 |
| 2015/0124246 | A1 * | 5/2015 | Collier ............... G02B 6/46 356/73.1 |
| 2016/0191152 | A1 * | 6/2016 | Soto ............... H04J 14/0275 398/16 |
| 2016/0191163 | A1 * | 6/2016 | Preston ............... G01H 9/004 398/16 |
| 2016/0248499 | A1 * | 8/2016 | Perron ............... H04B 10/071 |
| 2016/0356670 | A1 * | 12/2016 | Brillhart ............... H04B 10/071 |
| 2017/0356805 | A1 * | 12/2017 | Pei ............... G01J 4/00 |
| 2018/0292293 | A1 * | 10/2018 | Levin ............... G01M 11/3145 |

OTHER PUBLICATIONS

A.A.A. Bakar, "A new technique of real-time monitoring of fiberoptic cable networks transmission," Jun. 2, 2006, Optics and Lasers in Engineering 45 (2007) 126-129.*

Andrew Tanny Liem, "Distribution drop fiber in-service fault management in enhanced EPON system," Jan. 3, 2015, Optical Switching and Networking, vol. 17, Jul. 2015, pp. 52-57.*

H. Schmuck, "Embedded OTDR techniques for cost-efficient fibre monitoring in optical access networks," Mar. 16, 2009, 2006 European Conference on Optical Communications, pp. 1-2.*

Yu Wang, "Real-Time Distributed Vibration Monitoring System Using-OTDR," Dec. 20, 2016, IEEE Sensors Journal, vol. 17, No. 5, Mar. 1, 2017, pp. 1333-1336.*

Park et al., Coded optical time domain reflectometry: principle and applications, Proc. of SPIE vol. 6781, 678129 (2007).

AFL Telecommunications—Noyes, Test & Inspection, TURBOTEST 500B User's Guide, (available at least as of 2005), 76 pages.

AFL Telecommunications, Fiber Optic Loss / Return Loss Test Sets, 2003.

* cited by examiner

OTDR RECEIVE DEVICE WITH CONNECTIVITY FEEDBACK

TECHNICAL FIELD

The present description generally relates to Optical Time-Domain Reflectometry (OTDR), and more particularly to testing optical fiber links using an Optical Time-Domain Reflectometer.

BACKGROUND

Tier-1 (or Basic) fiber optic testing is a measurement of the overall characteristics of a fiber optic link, i.e. from one end to the other. These characteristics include the total link insertion loss, the total link length and optical fiber link continuity. Standard organizations recommend the use of a Light Source-Power Meter (LS/PM) solution to perform Tier-1 testing.

Optical Loss Test Sets (OLTS) are advanced implementations of the LS/PM solution. OLTSs allow to perform what is called "real-time continuity". OLTS units are working in pair wherein each unit is constantly monitoring communications received from the other one. Light sources and power meters are always active even when there is no acquisition in progress. As soon as the two units are connected to the same link, users located at each end of the link under test both receive visual and/or audible notifications to let them know that the units are connected to the same link and are ready to test.

Typically, any one of the two users can launch the acquisition. The two units exchange signals to launch the acquisition process and communicate test status information. Both users are therefore notified when an acquisition is ongoing and when the test process is completed. Both users receive PASS/FAIL status and, in some implementations, detailed information including the measured total link insertion loss and total link length. Both users have the necessary information to know if any additional action is needed for the current link or if they can move on to a next link to be tested.

Tier-2 (or "extended") fiber optic testing is used to characterize each loss contributor and potential issue along the link. Tier-2 testing is performed using an Optical Time-Domain Reflectometry (OTDR—also used to refer to the corresponding device). OTDR is a diagnostic technique where light pulses are launched in an optical fiber link and the returning light, arising from backscattering and reflections along the fiber link, is detected and analyzed. Various "events" along the fiber link can be detected and characterized through a proper analysis of the returning light in the time domain and insertion loss of the fiber link under test, as well as each component along the link, can be characterized.

Even when a single-ended OTDR approach is employed, two users are still generally required in order to characterize the last connector of the link: One user at the location A operates the OTDR unit and connects the link under test to the launch fiber. A second user at location B connects a receive fiber to the link under test. If the OTDR acquisition is launched before the receive fiber is connected, the test may not be reliable and the user at location A will not be informed of this situation until the end of the acquisition process. As such, users need to be in constant communication (verbal or text, e.g. via cell phones, talk-sets or other means) to coordinate their actions and replicate what is automated and highlighted above for the OLTS.

In a data center context, it is often mandatory to certify each newly installed fiber. In web-scale data centers, the number of individual tests to be carried out is enormous. In this context and in addition to short acquisition time, it becomes important to optimize transition time between each test. The above-noted communication that is required between the users in the single-ended OTDR solution is known to add transition time and slow down the testing process, which can become problematic in case of high-volume testing.

U.S. Pat. No. 9,184,833 is for optical fiber testing using an OTDR instrument. The method includes making a determination of a next fiber set to be tested when the fiber set is connected to the OTDR instrument. The system essentially monitors for a fiber to be connected to it and launches the test upon detection of the presence of the fiber without the user having to input a start command.

Unfortunately, a simple receive fiber by itself is not unique enough to build a reliable decision algorithm that will launch an acquisition only when the receive fiber is connected to the right fiber under test. Therefore, U.S. Pat. No. 9,184,833 describes manual controls added to the system to stop a false start or to manually launch the measurement. This does not however prevent inappropriate measurements as the test may start and complete without any indication to the user that the receive fiber is not connected. A further drawback of this method is that although user at location A may benefit from some level of automation, user at location B does not receive any relevant indications. User at location B does not know for example when the acquisition is completed, if the test result is "PASS" and if they can move on to the next fiber. To coordinate user actions, a constant communication is required between the two users (verbal or text, e.g. via cell phones, talk-sets or other means).

There therefore remains a need for a continuity feedback that is applicable to single-ended OTDR approaches.

SUMMARY

There is provided an OTDR receive device, an OTDR system comprising an OTDR receive device and an OTDR method wherein the OTDR unit and the OTDR receive device are to be connected at opposite ends of an optical fiber link under test. The OTDR receive device comprises means for the OTDR system to detect an established connectivity between the OTDR unit and the OTDR receive device via the optical fiber link under test, and a status indicator to notify a user of the receive device of the connectivity status and optionally an OTDR measurement status.

Connectivity detection allows to check for continuity between the OTDR unit and the OTDR receive device before launching an OTDR measurement, which ensures reliability of the test. A user of the OTDR unit does not need to communicate (e.g. voice or text messaging) with the user of the OTDR receive device to know when to start the acquisition.

In accordance with some embodiments, the OTDR receive device comprises a light source, a status detector and a status indicator. The status detector receives a status signal from the OTDR unit via the link under test, which status is notified to a user of the receive device via the status indicator (e.g. LED codes, an indication on a display screen, a sound signal).

Advantageously, the OTDR unit can check for continuity between the OTDR unit and the OTDR receive device before launching an OTDR measurement, which ensures reliability of the test. This way, a user of the OTDR unit does not need to communicate (e.g. voice or text messaging) with the user of the OTDR receive device to know when to start the acquisition.

When the acquisition process is completed, the OTDR unit can send a status signal to the OTDR receive device via the link under test, indicating that the test is completed and that the user operating the OTDR receive device can move on to the next fiber to be tested.

Furthermore, using the status detector and status indicator, the OTDR receive device can display or otherwise notify the user of the current status of the test, thereby allowing coordination of actions of the user of the OTDR receive device with that of the OTDR unit. The status indicator can confirm whether the OTDR receive device is detected by the OTDR unit to confirm that the OTDR receive device and the OTDR unit are connected to same fiber link. It can also indicate whether an acquisition is ongoing or whether the acquisition is completed.

In accordance with one aspect, there is provided a receive device to be used with an Optical Time-Domain Reflectometer (OTDR) unit when the OTDR unit and the OTDR receive device are connected toward opposite ends of an optical fiber link under test, the receive device comprising:
  a light source connectable toward the optical fiber link under test to transmit a presence signal that is detectable by the OTDR unit;
  a status detector coupled to the optical fiber path to receive a status signal propagating along the optical fiber link under test and determine a current status state therefrom; and
  a status indicator to notify a user of the receive device of the determined current status state.

In accordance with another aspect, there is provided an OTDR system comprising:
an OTDR unit comprising:
  an OTDR acquisition device connectable toward an end of an optical fiber link under test for performing one or more OTDR acquisitions toward the optical fiber link;
  a processing unit configured to analyze OTDR acquisitions;
  a light signal generator configured to send a status signal representative of a current status state via the optical fiber link under test; and
a receive device to be connected to the other end of the optical fiber link under test and comprising:
  a light source connectable toward the optical fiber link under test to transmit a presence signal that is detectable by the OTDR unit; and
  a status indicator to notify a user of the receive device of the current status state received from the OTDR unit;
wherein the OTDR unit is configured to detect a presence of the receive device at an opposite end of the optical fiber link under test by detecting the presence signal.

In accordance with one aspect, there is provided a receive device to be used with an Optical Time-Domain Reflectometer (OTDR) unit when the OTDR unit and the OTDR receive device are connected toward opposite ends of an optical fiber link under test, the receive device comprising:
  an optical fiber path connectable toward the optical fiber link under test and comprising event features defining a signature that is detectable by the OTDR unit;
  a status detector coupled to the optical fiber path to receive a status signal propagating along the optical fiber link under test and determine a current status state therefrom; and
  a status indicator to notify a user of the receive device of the determined current status state.

The current status state may be one of a plurality of status states comprising: a) an OTDR measurement is ongoing; and b) an OTDR measurement is completed. Other status states may comprise: c) no connectivity.

In some embodiments, the receive device does not have any status signal transmission capability. It notifies status received by the OTDR unit in a rather passive way.

In some embodiments, the receive device has both status reception and transmission capabilities. The receive device may comprise a light source connected toward the optical fiber link under test, such that the OTDR can detect the presence of the receive device by receiving a response signal from the receive device after a generated ping request. Alternatively, the OTDR unit and the receive device may each comprise a radio communication module to exchange messages. The receive device having both status reception and transmission capabilities, it can exchange messages with the OTDR unit.

In some embodiments, the status signal comprises OTDR test light pulses indicating a) that an OTDR measurement is ongoing. The status detector thereby detects OTDR activity to detect that an OTDR measurement is ongoing.

In some embodiments, the receive device comprises a battery level indicator.

In some embodiments, the status states further indicate a test result status such as a PASS or a FAIL result (e.g. the plurality of status states comprise c) OTDR measurement is completed and results are PASS; and d) OTDR measurement is completed and results are FAIL). The status states may also further indicate an action to be accomplished (e.g. "verify", "retry" and "go to next link").

In some embodiments, the status indicator comprises a set of light emitting diodes (LEDs). The status indicator may further comprise a buzzer to generate a sound signal. Optionally, additionally or alternatively to the set of LEDs, the status indicator may comprise a graphical representation on a display screen, which may take the form of, e.g., an icon selected among a set of different icons and/or a color code.

In some embodiments, the optical fiber link under test comprises a multi-fiber array cable and the receive device comprises a plurality of optical fiber paths connectable toward the plurality of optical fibers of the multi-fiber array cable, each optical fiber paths defining corresponding signatures that are mutually-distinguishable by the OTDR unit.

By detecting the mutually-distinguishable signatures, the OTDR unit can further determine an arrangement/cable type of the multi-fiber array cable (e.g. Type A, B or C as defined by TIA/EIA-568-C.3 Standard).

In some embodiments, the optical fiber link under test comprises at least two optical fiber links (e.g. arranged in a duplex cable or a multi-fiber array cable) and opposite ends of the optical fiber path are each connectable toward a respective one of the two optical fiber links (so as to form a loopback arrangement).

Using the loopback arrangement, a bidirectional OTDR measurement can be obtained on the optical fiber links by performing OTDR measurement from each of the two optical fiber links.

In accordance with another aspect, there is provided an OTDR system comprising:
an OTDR unit comprising:
  an OTDR acquisition device connectable toward an end of an optical fiber link under test for performing one or more OTDR acquisitions toward the optical fiber link;

a processing unit configured to analyze OTDR acquisitions;
a light signal generator configured to send a status signal representative of a current status state via the optical fiber link under test; and
a receive device as described hereinabove;
wherein the processing unit is configured to determine a presence of the receive device at the opposite end of the optical fiber link under test by detecting the signature in an OTDR acquisition.

In accordance with another aspect, there is provided an OTDR system comprising:
an OTDR unit comprising:
an OTDR acquisition device connectable toward an end of an optical fiber link under test for performing one or more OTDR acquisitions toward the optical fiber link;
a processing unit configured to analyze the one or more OTDR acquisitions; and
a status state transmitter configured to send a status signal representative of a current status state; and
a receive device comprising:
an optical fiber path connectable toward the optical fiber link under test and comprising event features defining a signature that is detectable by the OTDR unit; and
a status indicator to notify a user of the receive device of the current status state received from the OTDR unit; and
wherein the processing unit is configured to determine a presence of the receive device at an opposite end of the optical fiber link under test by detecting the signature in the one or more OTDR acquisitions.

In some embodiments, the status state transmitter comprises a light signal generator configured to send a status signal representative of a current status state via the optical fiber link under test; and the receive device further comprises a status detector coupled to the optical fiber path to receive a status signal propagating along the optical fiber link under test and determine the current status state therefrom.

In some other embodiments, the status state transmitter transmits the status signal to the receive device via a wireless communication link established between the OTDR unit and the receive device.

In some embodiments, the OTDR unit comprises a status indicator to notify a user of the OTDR unit of the current status state. The current status state may be one of a plurality of status states comprising: a) a connectivity is detected between the OTDR unit and the receive device; and b) no connectivity is detected between the OTDR unit and the receive device.

Advantageously, by observing the status indicator, a user of the OTDR unit can be kept informed of the tasks completed by the user on the receive device side and, optionally, the user of the OTDR unit can launch an OTDR measurement once connectivity with the receive device is established.

In accordance with another aspect, there is provided an OTDR system comprising:
an OTDR unit comprising:
an OTDR acquisition device connectable toward an end of an optical fiber link under test for performing one or more OTDR acquisitions toward the optical fiber link;
a processing unit configured to analyze the one or more OTDR acquisitions; and
a receive device comprising:
a connectivity detector comprising a light detector and configured to detect generated by the OTDR unit a presence of light in the optical fiber link under test, a presence of said light being indicative of an established optical connectivity between the OTDR unit and the receive device;
a communication module configured to transmit a connectivity status signal representative of a connectivity status between the OTDR unit and the receive device; and
a status indicator to notify a user of the receive device of the connectivity status.

In some embodiments, the OTDR unit further comprises a status state transmitter configured to send a status signal representative of a current status state; the communication module of the receive device is further configured to receive said status signal; and the status indicator further notifies a user of the receive device of said current status state.

In accordance with yet another aspect, there is provided an OTDR method for conducting OTDR measurements using an OTDR unit and a receive device that are connected toward opposite ends of an optical fiber link under test, the method comprising:
in a no-connectivity state, repeatedly performing OTDR acquisitions toward the optical fiber link to produce OTDR traces and analyzing the acquired OTDR traces to detect, in the acquired OTDR traces, a signature associated with the receive device;
upon detection of said signature:
in an ongoing-OTDR-measurement state, performing one or more OTDR acquisitions toward the optical fiber link to perform an OTDR measurement; and
in a measurement-completed state, the OTDR unit transmitting a status signal toward receive device via the optical fiber link, the status signal being indicative of the measurement-completed state.

In accordance with yet another aspect, there is provided an OTDR method for conducting OTDR measurements using an OTDR unit and a receive device that are connected toward opposite ends of an optical fiber link under test, the method comprising:
in a no-connectivity state, the OTDR unit repeatedly launching a continuity test signal toward the optical fiber link;
upon connectivity detection:
in an ongoing-OTDR-measurement state, performing one or more OTDR acquisitions toward the optical fiber link to perform an OTDR measurement; and
in a measurement-completed state, the OTDR unit transmitting a status signal toward receive device, the status signal being indicative of the measurement-completed state.

In some embodiments, the continuity test signal may take the form of an OTDR test signal; and in a no-connectivity state, OTDR acquisitions performed repeatedly toward the optical fiber link to produce OTDR traces and the acquired OTDR traces are analyzed to detect, in the acquired OTDR traces, a signature associated with the receive device, a connectivity being detected upon a detection of said signature.

In some other embodiments, the receive device detects a connectivity between the OTDR unit and the receive device by detecting the continuity test signal; and the receive device transmits a connectivity status signal representative of said the detected connectivity.

In some embodiments, the OTDR unit transmits the status signal to the receive device via the optical fiber link under test. In other embodiments, the OTDR unit transmits the status signal to the receive device via a wireless communication link established between the OTDR unit and the receive device.

Advantageously, by observing a status indicator indicative of the measurement-completed state, a user operating the receive device can move on to a next fiber to be tested.

In this specification, unless otherwise mentioned, word modifiers such as "substantially" and "about" which modify a condition or relationship characteristic of a feature of features of an embodiment, should be understood to mean that the condition or characteristic is defined to within tolerances that are acceptable for proper operation of that embodiment in the context of an application for which it is intended.

Throughout this specification reference is made to optical reflectometric technology and more specifically to OTDR technology. It is noted that optical reflectometric technology is herein meant to encompass all variations of optical reflectometric technology to which the provided method and system may equivalently apply. Examples of such variations include Optical Frequency Domain Reflectometry (OFDR) (e.g., see U.S. Pat. No. 7,515,276 to FROGGATT et al), and coded OTDR technology (see Park et al. "Coded optical time domain reflectometry: principle and applications", Proc. of SPIE Vol. 6781, 678129 (2007)) also referred to as correlation OTDR. Other variations are also meant to be encompassed.

BRIEF DESCRIPTION OF THE DRAWINGS

Further features and exemplary advantages of the present invention will become apparent to the skilled person from the following detailed description, taken in conjunction with the appended drawings, in which.

Figure 1:
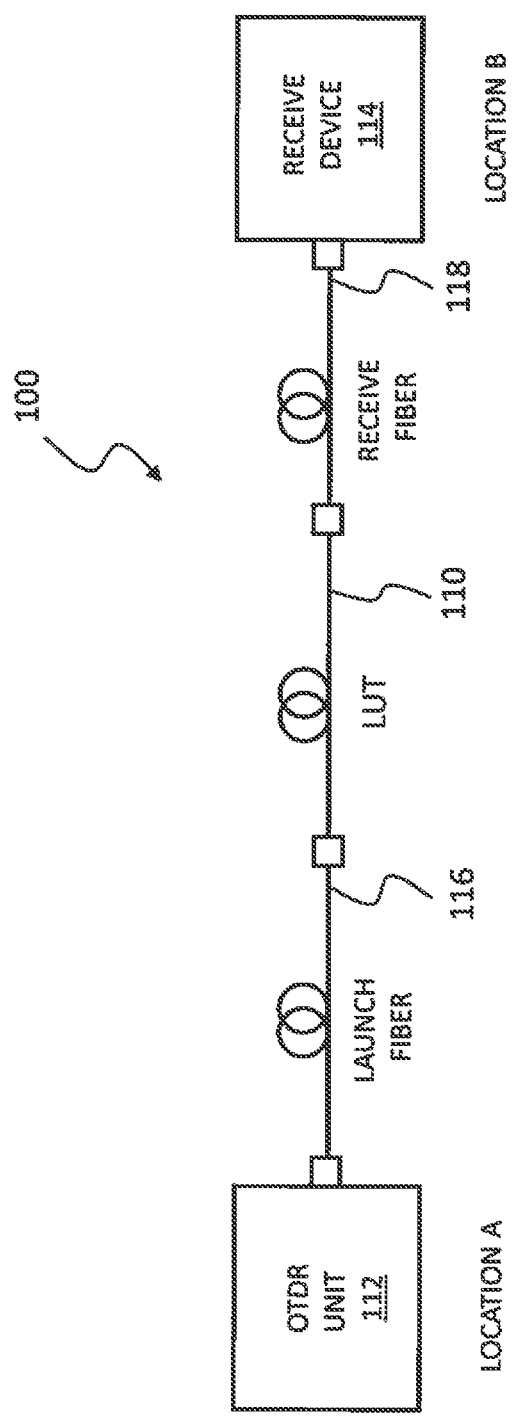
FIG. 1 is a block diagram illustrating an OTDR system in accordance with one embodiment configured to test a simplex optical fiber link under test.

It will be noted that throughout the drawings, like features are identified by like reference numerals. To not unduly encumber the figures, some elements may not be indicated in some figures if they were already identified in a preceding figure. It should be understood herein that elements of the drawings are not necessarily depicted to scale. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

In accordance with one embodiment, the present description provides an OTDR receive device (also referred to herein simply as a "receive device") that is configured to receive a status signal from an OTDR unit, through an optical fiber link under test (also referred to herein simply as the "link under test" or the LUT) or, in other embodiments, via a wireless communication. The receive device can incorporate or be combined with one or multiple receive fibers and/or optical signature devices. It comprises an electronic circuit that is able to decode a status signal received from the OTDR unit and may optionally detect normal OTDR measurement activity. The receive device may display or otherwise notify the user of the receive device about the current test status, in order to coordinate his/her actions with that of the user of the OTDR unit, located at the opposite end of the optical fiber link under test. The receive device comprises event features that are configured to generate a signature that is detectable by the OTDR unit. The OTDR unit confirms the presence of the receive device at the opposite end of the link under test by detecting the signature on acquired an OTDR trace or by receiving a response signal from the receive device, if equipped with a light signal generator.

Now referring to the drawings, FIG. 1 shows an OTDR test system 100 configured to test a simplex optical fiber link under test 110 and comprising an OTDR unit 112 and a receive device 114, in accordance with one embodiment. As illustrated herein, the OTDR test system 100 is employed to test a link under test 110 connecting location A to location B. As known in the art, OTDR acquisitions are typically performed with an optional launch fiber 116 and an optional receive fiber 118, respectively connected to the near and far ends of the link under test 110, in order to allow total loss characterization of the link, including characterization of input and output connectors. If location A and location B are remote, user A of the OTDR unit 112 and user B of the receive device 114 may not be able to communicate verbally. However, in the context of testing/certifying multiple links under test between location A and location B, the users A and B need to coordinate their actions. For example, once an OTDR measurement is completed for one of the links under test, both users need to disconnect their respective device and connect it to the next link to be tested. As described in more details hereinbelow, the receive device 114 is equipped with a status indicator (not shown) to notify user B of the current status state, so as to coordinate his/her actions with that of user A.

Figure 2:
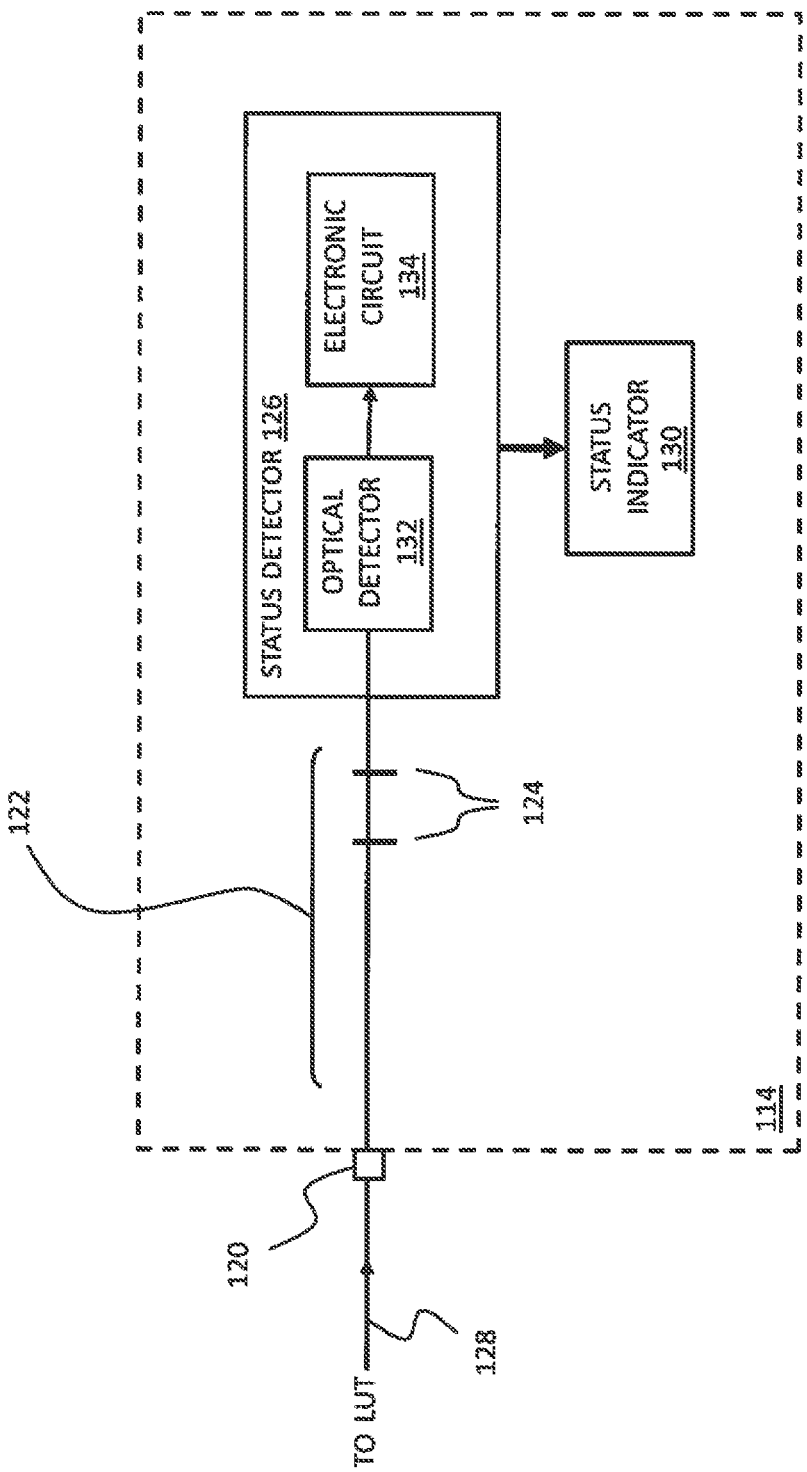
FIG. 2 is a block diagram illustrating in more details a receive device for use in the OTDR system of FIG. 1, in accordance with one embodiment.

FIG. 2 shows an embodiment of the receive device 114 for use in the OTDR system of FIG. 1. The receive device 114 comprises an input interface 120, e.g. an optical fiber connector, to connect the receive device 114 towards the link under test 110, either directly or via the receive fiber 118; a signed optical fiber path 122 connectable toward the link under test via the input interface 120; a status detector 126; and a status indicator 130.

The signed optical fiber path 122 is embodied as a segment of optical fiber along which event features 124—such as connectors, splices, an end of fiber (connectorized or not) or any other element along the optical fiber path 122 that may produce a detectable disruption on acquired OTDR traces—are disposed in order to generate a signature that is detectable and recognizable on an OTDR trace acquired by the OTDR unit 112 based on at least one characteristic associated with the event features 124.

The status detector 126 is coupled to the optical fiber path 122 in order to receive light exiting the link under test 110, via the optical fiber path 122, including a status signal 128 propagating along the link under test 110. The status detector 126 detects the status signal 128 and determines therefrom a current status state. The status detector 126 comprises an optical detector 132, such as a PIN photodiode, an avalanche photodiode or any other suitable photodetector, and an associated electronic circuit 134. In one embodiment, the electronic circuit 134 may comprise an amplification circuit, an analog-to-digital converter and a logic circuit configured to determine the current status state from the status signal detected by the optical detector 132. It will be understood that the optical and/or the electrical signal may further be amplified, filtered or otherwise processed before or after photodetection. For example, the logic circuit may comprise, e.g., one or more Field Programmable Gate Array (FPGA); one or more Application Specific Integrated Circuits (ASICs), one or more microprocessors or any custom logic circuit. In another embodiment, the electronic circuit 134 may comprise custom analog or analog/digital electronic circuits, comprising filters, operational amplifiers and the like, configured to produce a logic signal representative of the current status state, from the status signal detected by the optical detector 132.

The status indicator 130 receives the status state as detected by the status detector 126 and visually and/or audibly notify user B of the receive device 114 about the determined current status state. It may comprise light indicators (e.g. LEDs), a graphical display (e.g. a display screen), a sound signal (buzzer, beeper or verbal notifications), or a any combination thereof. In one embodiment, the status indicator 130 may be embodied by a LED or a set of LEDs such that one LED is associated with each possible status. For example, LEDs may be disposed in an array and/or be color-coded. In another embodiment, the status indicator 130 may be embodied by a buzzer or a beeper producing specific sounds associated with the possible status states. In other embodiments, the receive device 114 may further comprise a display screen on which a status indicator 130 is displayed in the form of a text string or one or more graphical elements such as icons. If present, such a display screen may further be used to display any other data or information received from the OTDR unit 112 via the status detector 126, including, e.g. PASS/FAIL results, numerical test results, or an estimated remaining time before completion of an ongoing OTDR measurement.

It is noted that although in the embodiment of FIG. 1 the receive fiber 118 and the receive device 114 are provided as distinct components, in some other embodiments, the receive fiber 118 may be integrated within the receive device 114 or form part of the signed optical fiber path 122.

It is noted that the receive device 114 is preferably battery powered (power source not shown).

Figure 3:
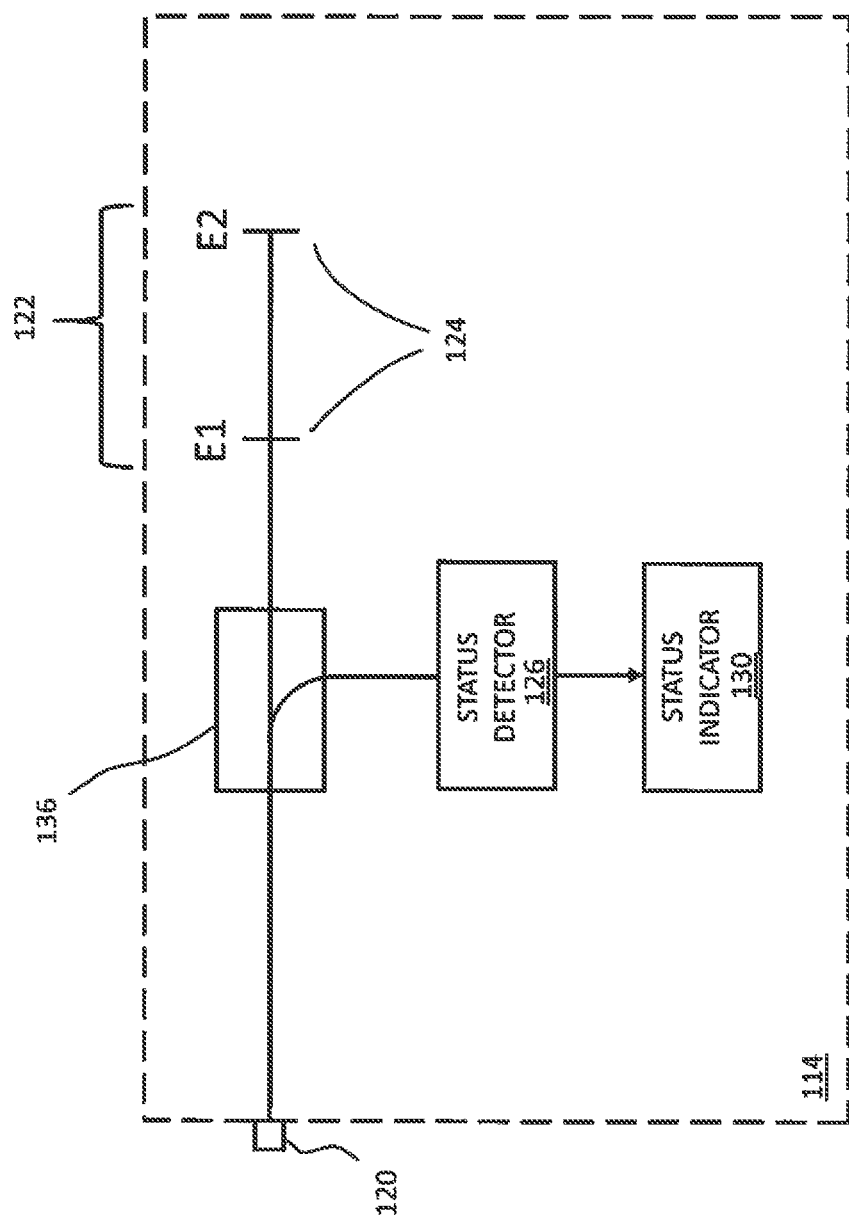
FIG. 3 is a block diagram illustrating in more details a receive device for use in the OTDR system of FIG. 1, in accordance with another embodiment.

FIG. 3 shows another embodiment of the receive device 114 of FIG. 1, comprising an optical splitter 136 along the signed optical fiber path 122 and employed to extract part of light received from the link under test 110 at the input interface 120 and direct the extracted part towards the status detector 126.

As noted hereinabove, a receive fiber 118 may be integrated in the receive device 114 or be distinct and connectable towards the receive device 114.

Signature:

The signature produced by one or more event features 124 of the signed optical fiber path 122 is used by the OTDR unit 112 to check for continuity between the OTDR unit 112 and the receive device 114 via the link under test 110, i.e. to check that the OTDR unit 112 and the receive device 114 are connected to the same link under test 110 before launching an OTDR measurement. Signature detection ensures reliability of the OTDR measurement.

The signature is produced by one or more event features 124 disposed along the signed optical fiber path 122. The event features 124 consist of features that are detectable on acquired OTDR traces by generating distinct events such as reflective events. Characteristics of the signature associated with the event features 124 can be used to recognize a presence of the signature, and therefore of the receive device 114 connected to the link under test 110, via at least one acquisition performed by the OTDR unit 112, and/or to distinguish distinct signatures from one another for polarity detection.

Although in theory, a single event feature having a specific characteristic, e.g., a determined reflectivity value, may be sufficient to recognize the presence of the receive device 114, reliability of the recognition is largely improved by at least two event features 124.

In some embodiments, event features E1 and E2 are produced by non-angle polished physical contact connections (such as a FC/PC connector) introduced along the optical fiber path 122 and spaced apart by a determined distance. A characteristic of the signature can be defined by the optical distance L1 between the two event features E1 and E2, which defines a characteristic that is detectable on an acquired OTDR trace. In such embodiments, a given unique signature may be recognized in an OTDR trace by identifying, at a position along the OTDR trace that is consistent with the position of the receive device 114, two reflective events that are spaced apart by a given optical distance L1.

In some embodiments, the optical splitter 136 and/or the end of the optical fiber path on the optical detector 132 may themselves serve as event features 124 to define an optical distance recognizable as a signature.

Other optical configurations that may be used to produce a signature are described, for example, in U.S. Pat. No. 8,482,725 which is commonly owned by Applicant and hereby incorporated by reference (see FIGS. 3, 4 and 5 and the related description).

The one or more characteristics of each signature (e.g., reflection amplitudes, distance values between reflective events, etc.) may be defined by design and be recorded as expected values; previously characterized for each specific receive device 114 (e.g. at factory); or be determined by the OTDR unit 112 via a prior calibration process during which an OTDR trace is acquired while the receive device 114 is connected to the OTDR unit 112, without the link under test 110.

Status Signal:

The status signal is produced by the OTDR unit 112 and is employed by the receive device 114 to determine the current status state of an ongoing OTDR test procedure. The status signal may take the form of an optical signal generated by the OTDR unit 112 and propagated through the link under test 110. The status signal may be generated at the OTDR acquisition wavelength, in this case optionally using the OTDR light source employed for generating the OTDR test signal, or at a different wavelength. For example, the status signal may be binary encoded or consist of mutually-distinguishable emission states of the OTDR light source, e.g. continuous, pulsed and off.

In one embodiment, the current status state is one of a plurality of possible status states comprising, for example:

A) an OTDR measurement is ongoing;
B) an OTDR measurement is completed; and
C) no connectivity.

Associated status signals may consist of:

A) OTDR pulsed signal (duty cycle less than, e.g., 1%);
B) continuous signal or binary-coded signal (duty cycle greater than, e.g., 1%); and
C) no signal.

Accordingly, in one embodiment, the status detector 126 is configured to distinguish an OTDR pulsed signal (A) from a continuous or binary-coded transmission signal (B) and no signal (C), based, e.g., on an average optical power and/or a duty cycle of the received status signal.

Of course, in other embodiments, the status signal may be based on a binary-coded signal transmitted periodically or at each state transition and detected by the status detector 126.

Optionally, upon completion of an OTDR measurement, further status states transmitted via a binary-coded status signal may be employed to indicate the next action, i.e., move to the next fiber or disconnect, clean & reconnect to the same fiber. Status states may thus include, for example:

a) connectivity detected;
b) OTDR measurement ongoing;
c) OTDR measurement completed;
d) disconnect and connect to next link; and
e) disconnect, clean and reconnect to same link;

In addition to the current status states, the status signal may be employed to indicate a test result status such as a "PASS" result, i.e., OTDR measurement is completed and the results are satisfactory of established decision criteria; or a "FAIL" result, i.e., OTDR measurement is completed and the results are not satisfactory of established decision criteria. Status statuses may therefore additionally include, for example:

c1) OTDR measurement is completed and results are PASS; and
c2) OTDR measurement is completed and results are FAIL.

Of course, additional status states may be included as needed.

Figure 4:
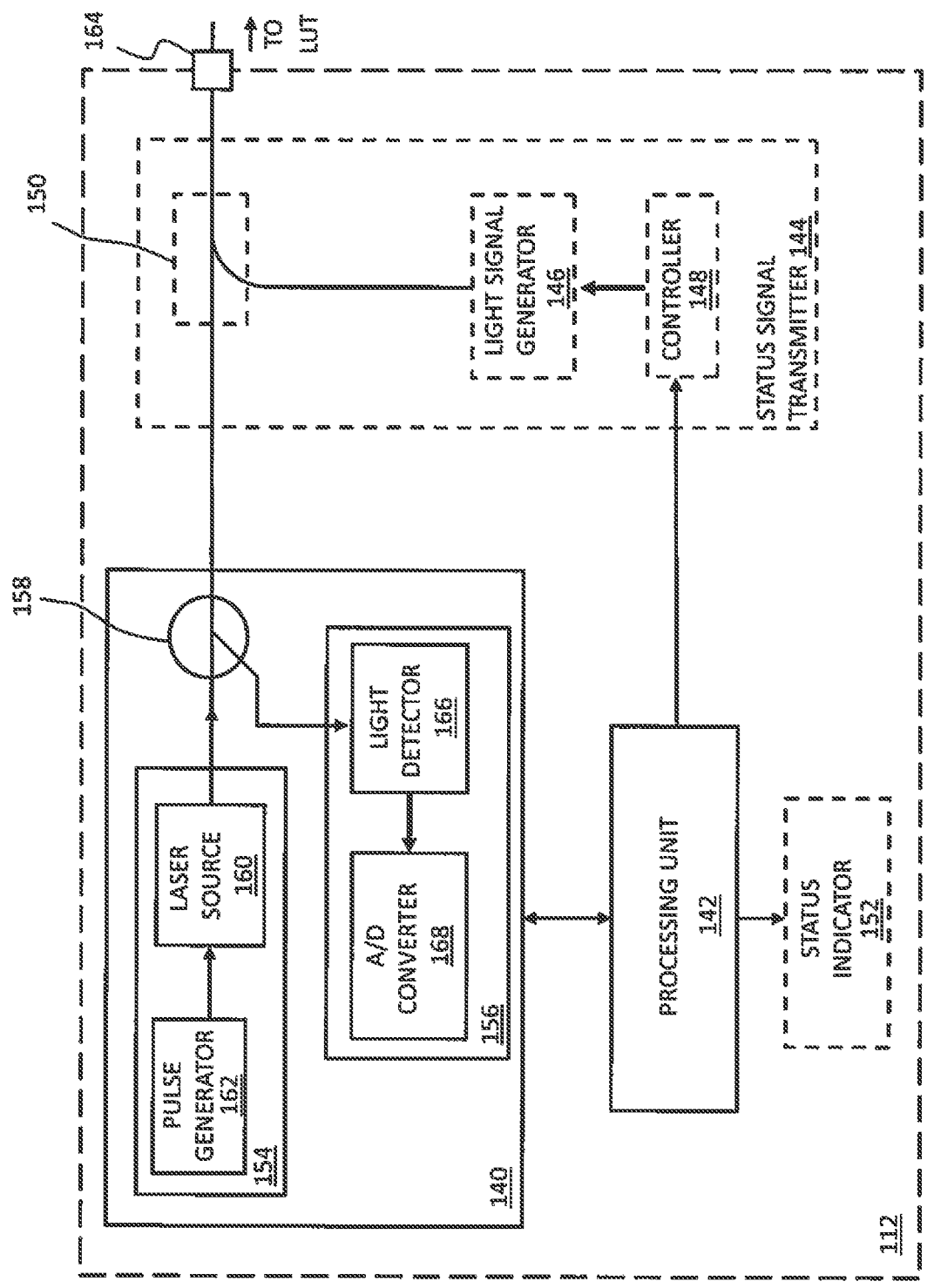
FIG. 4 is a block diagram illustrating in more details the OTDR unit of FIG. 1, in accordance with one embodiment.

FIG. 4 shows an embodiment of an OTDR unit 112 for use in the OTDR system of FIG. 1.

OTDR is a diagnostic technique for optical fiber links where a test signal in the form of light pulses is launched in the optical fiber link under test 110 and the return light signal, arising from backscattering and reflections along the link, is detected. Herein, the process of launching a test signal and acquiring the return light signal to obtain therefrom an OTDR trace is referred to as an "OTDR acquisition". The acquired power level of the return signal as a function of time is referred to as an "OTDR trace", where the time scale is representative of distance between the OTDR acquisition device and a point along the fiber link.

The OTDR unit 112 comprises an OTDR acquisition device 140 connectable toward the link under test 110 via an output interface 164, for performing OTDR acquisitions toward the link under test 110. The OTDR acquisition device 140 comprises conventional optical hardware and electronics as known in the art for performing OTDR acquisitions on an optical fiber link.

The OTDR acquisition device 140 comprises a light generating assembly 154, a detection assembly 156 and a directional coupler 158.

The light generating assembly 154 is embodied by a laser source 160 driven by a pulse generator 162 to generate the test signal comprising test light pulses having desired characteristics. As known in the art, the light generating assembly 154 is adapted to generate test light pulses of varied pulse widths and optical power through a proper control of the pattern produced by the pulse generator 162.

The light generating assembly 154 is coupled to the output of the OTDR unit 112 through a directional coupler 158, such as a circulator, having three or more ports. The first port is connected to the light generating assembly 154 to receive the test light pulses therefrom. The second port is connected toward the output interface 164 of the OTDR unit 112. The third port is connected to the detection assembly 156.

The detection assembly 156 comprises a light detector 166, such as a photodiode, an avalanche photodiode or any other suitable photodetector, which detects the return light signal corresponding to each test light pulse, and a converter 168 to convert the electrical signal proportional to the detected return light signal from analog to digital in order to allow processing and analysis.

The OTDR unit 112 further comprises a processing unit 142 configured to analyze OTDR acquisitions obtained by the OTDR acquisition device 140 to obtain therefrom an OTDR measurement and/or detect a presence of the receive device 114. The processing unit 142 may identify and characterize one or more events along the link through a proper analysis of the return signal in the time domain. The events are typically characterized in terms of location, insertion loss and reflectance parameters while optical fiber segments may be characterized in terms of length and attenuation parameters.

In some use cases, an OTDR measurement may involve one or a plurality of OTDR acquisitions (e.g. obtained with varying multiple pulse widths), an analysis of which can provide a characterization of the optical fiber link under test. Results of such analysis may be referred to as OTDR measurement results, which may be useful for optical fiber link diagnosis. OTDR measurement results may provide values of total insertion loss and/or total length and/or a link characterization and may or may not involve a Tier-1 certification or Tier-2 detailed characterization of components along the optical fiber link.

In some other use cases, the processing unit 142 may detect a presence of a receive device 114 at the opposite end of the optical fiber link under test through proper analysis of one or more OTDR acquisitions allowing detection of the signature the OTDR acquisition(s), without necessarily characterizing the link under test 110.

In one embodiment, the status signal transmitter is embodied by the laser source 160 of the OTDR acquisition device 140, thereby eliminating the need for a separate status signal transmitter 144 and a coupler 150. The status signal may be binary coded or conveniently consist of mutually-distinguishable emission states of the laser source 160, e.g. continuous, pulsed and off. Emission states and/or binary codes of the laser source 160 may be controlled, e.g., by the processing unit 142.

In another embodiment, the OTDR unit 112 further comprises an status signal transmitter 144 configured to send a status signal representative of a current status state toward the link under test 110. In this configuration, the status signal transmitter 144 comprises a light signal generator 146, such as a light emitting diode (LED), a laser diode or any other suitable light signal generator, and an associated controlling electronic circuit 148, such as a logic circuit embodied as, e.g., one or more Field Programmable Gate Array (FPGA), a microprocessor or any custom logic circuit. The status sign a transmitter 144 further comprises a coupler 150 such as a fiber optic coupler that combines the status signal and the OTDR test signal toward a connectorized OTDR output interface 164 to be connected towards the link under test 110. The coupler 150 may be embodied, e.g., by a wavelength-dependent fused coupler, a power splitting/combining fused coupler or bulk filter coupler.

As mentioned herein above, the wavelength associated with the light signal generator 146 may be the same as that or those of the OTDR acquisition device 140 or may be a different one.

Optionally, the status signal transmitter 144 can send text messages, in the form of a binary-coded signal, to be displayed by the receive device 114 via the status indicator 130 or a separate display device.

The processing unit 142 may further embody a controller or a separate controller be included and configured to control the OTDR measurement process including a logic state machine defining current status state thereof, and control the OTDR unit 112, including the OTDR acquisition device 140 to launch OTDR acquisitions.

The OTDR unit 112 may further comprise a status indicator 152 to notify the current status state to user A. In one embodiment, the status indicator 152 may be embodied by a LED or a set of LEDs respectively associated with possible statuses.

For example, LEDs may be disposed in an array and/or be color-coded. In another embodiment, the status indicator 152 may be embodied by a buzzer or a beeper producing specific sounds associated with the possible status states. In other embodiments, the OTDR unit 112 may further comprise a display screen on which a status indicator 152 is displayed in the form of a text string or one or more graphical elements such as icons. If present, such a display screen may further be used to display any other data or information produced by the OTDR unit 112, including, e.g. PASS/FAIL results or numerical test results.

Of course, the OTDR acquisition device 140 may also be used to perform multiple acquisitions with varied pulse widths to obtain a multi-pulse width OTDR measurement. The thereby obtained OTDR acquisitions will be typically stored in memory (not shown) for further processing.

The controller is used to control the acquisition conditions for each light acquisition, by controlling the light generating assembly 154 to generate test light pulses having variable pulse widths, wavelengths and/or optical power.

The OTDR traces acquired from the optical fiber links 416 are then received and analyzed by the processing unit 142.

The processing unit 142 executes an analyzing software and, in some embodiments, may be made integral, partially external or totally external to the OTDR unit 112 used to perform the acquisitions. The analyzing software performs the calculations necessary to characterize events along one of the link under test 110 and to detect a presence of a receive device 114 by recognizing the associated signature. The analyzing software identifies and optionally characterizes events along the link under test 110 through analysis of one or more OTDR traces. Although a single OTDR acquisition may be necessary to detect a presence of the receive device 114, it is envisaged that a plurality of such OTDR acquisitions may be necessary to characterize all events present along the link under test 110.

The described systems and methods may also involve performing additional light acquisitions under varying acquisition conditions. For example, the systems and methods described herein may further employ multi-pulse width bi-directional OTDR analysis, as described in U.S. Patent Application Publication no. US2014/0198311A1 to L'Heureux et al. dated Jul. 17, 2014 and which is commonly owned by Applicant and hereby incorporated by reference.

Figure 5:
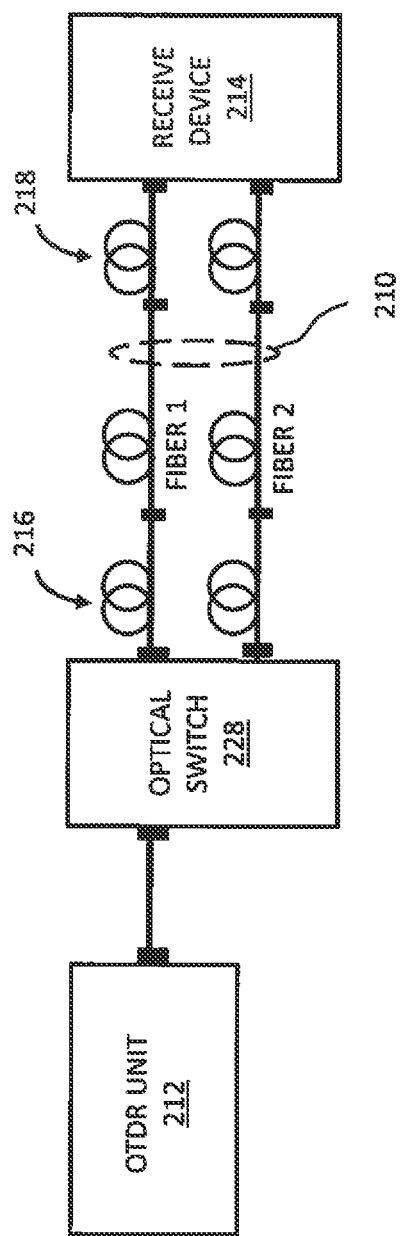
FIG. 5 is a block diagram illustrating an OTDR system in accordance with another embodiment configured to test a duplex optical fiber link under test.

Duplex Configuration:

FIG. 5 shows an embodiment of an OTDR test system 200 configured to test a duplex optical fiber link under test 210 (or any other pair of optical fiber links under test). The OTDR test system 200 comprises an OTDR unit 212, a 1×2 optical switch 228, a duplex launch cable 216, a duplex receive cable 218 and a duplex receive device 214 comprising a loopback arrangement. A duplex fiber cable link generally consists of two strands of optical fibers (defining two optical fiber paths) and is used for duplex communication between devices, wherein the two strands of optical fibers are used for communication in opposite directions (transmitting and receiving fibers). When testing duplex links, bi-directional OTDR measurements may be obtained by sequentially performing OTDR measurements toward each optical fiber path of the duplex link, manually or using the 1×2 optical switch 228, while the optical paths are looped back via the receive device.

Figure 6:
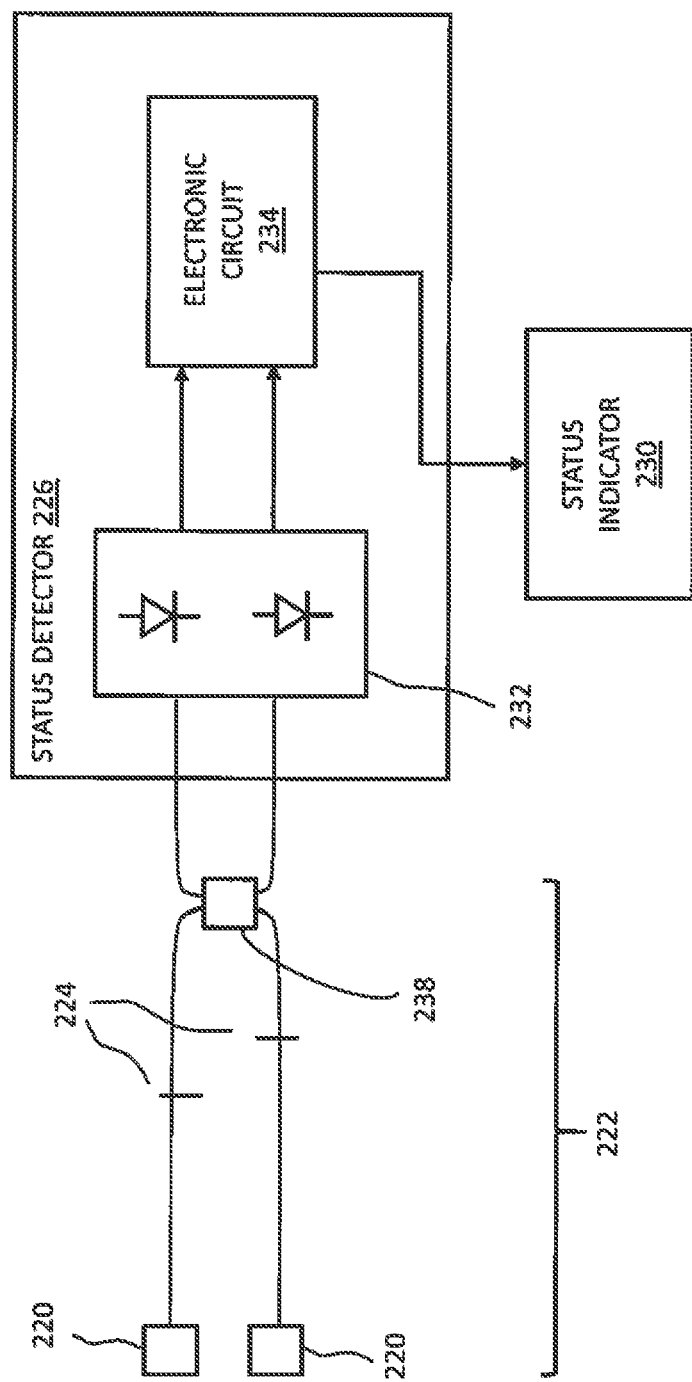
FIG. 6 is a block diagram illustrating in more details the receive device of FIG. 5.

FIG. 6 shows an embodiment of a duplex receive device 214 for use in the OTDR system of FIG. 5 in testing duplex optical fiber links or any other pair of optical fiber links. The duplex receive device 214 comprises a signed optical fiber path 222 that is connected in loop between a first and second input interfaces connectable respectively towards a first and a second fiber of the duplex optical fiber link under test 210, to form a loopback arrangement. The signed optical fiber path 222 comprises event features 224 defining a recognizable signature. A tap coupler 238 is introduced along the signed optical fiber path 222 to extract part of light received from each fiber of the duplex link under test 210 at the input interfaces 220 and direct the extracted parts towards the status detector 226.

In the embodiment of FIG. 6, the signature is pass-through, low-loss and is used to loopback a pair of receive fibers to enable bi-directional OTDR measurement. The signature may be made directionality asymmetric to provide a distinguishable signature for each input interface 220 and thereby allow polarity detection.

Figure 7:
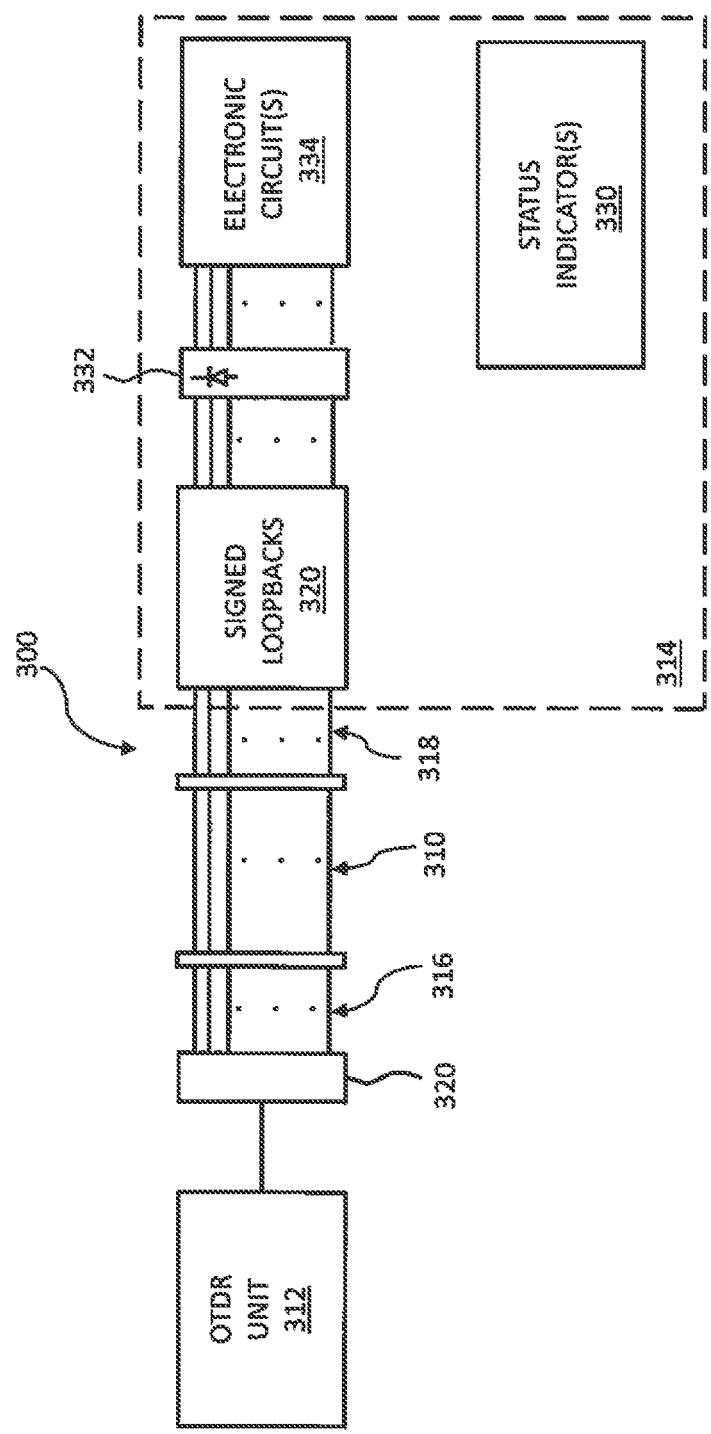
FIG. 7 is schematic illustrating an OTDR system in accordance with yet another embodiment configured to test a multi-fiber optical fiber link under test.

It will be understood that the tap coupler 238 and the end of fiber on the optical detector(s) 232 may themselves constitute event features 224 that create the signature, such that additional event features 224 may or may not be included. The status detector 226 and the status indicator 230 are respectively similar to status detector 126 and status indicator 130 described hereinabove. In the embodiment of FIG. 7, the status detector 226 comprises a pair of optical detectors 232 and corresponding electronic circuits 234. In another embodiment, the status detector 226 may comprise a single optical detector 232 and corresponding electronic circuit 234 coupled to a selected one of the fiber paths. In this case, the OTDR unit 212 may be configured to transmit a status signal to either fiber path in alternance. In yet another embodiment, the status detector 226 may comprise a single optical detector 232 and corresponding electronic circuit 234 coupled to both fiber paths.

Of course, the receive device 214 of FIG. 6 may be modified for use with multi-fiber array cable links under test (including 12, 16, 24, etc. fibers).

Multi-Fiber Array Cable Configuration:

Multi-fiber array cables are also commonly employed in combination with duplex optical cabling and optical fiber transition modules in premises optical fiber cabling. Multi-fiber array cabling may be arranged in duplex or parallel configurations. In a duplex multi-fiber array configuration, the optical fibers are arranged on the multi-fiber connectors such that on pairs of adjacent optical fibers, one fiber is used for transmitting and the other for receiving. Transmission and reception fibers therefore alternate on the connector. In a parallel multi-fiber array configuration, optical fibers used for transmitting and that used for receiving are physically separated into two groups of adjacent fibers on the multi-fiber array connectors. The position of receiving and transmitting optical fibers at a multi-fiber connector defines what is referred to in the industry as the polarity. Array system connectivity requires specific combinations of duplex patch cords, multi-fiber array cables and optical fiber transition modules in order to properly manage polarities in duplex or parallel configurations. Because various multi-fiber array configurations are possible (i.e. duplex configuration, one-plug parallel configuration, two-plug one-row parallel configuration and one-plug two-row configuration, see TIA/EIA-568-C.3), various multi-fiber array cable types are defined by the TIA/EIA-568-C.3 Standard, each having a specific 1×12 or 2×12 fiber arrangement. Type A cables as defined by the Standard are designed with a key inversion but no duplex pair twists between the input and output connectors. Type B cables are designed with no key inversion and no duplex pair twists. Type C cables are designed with a key inversion and with duplex pair twists. In one array systems, combinations of different cable types may be required depending on the multi-fiber array configuration employed. Hence, deployment mistakes can easily occur if the appropriate arrangement of cable types is not followed (e.g. some cables are mixed up) which result in improper fiber polarity at the multi-fiber array connections.

FIG. 7 shows an embodiment of an OTDR test system 300 configured to test a multi-fiber array cable link under test 310. The OTDR test system 300 comprises an OTDR unit 312, an optical switch 320, a multi-fiber launch cable 316, a multi-fiber receive cable 318 and a multi-fiber receive device 314 comprising loopback arrangements. The receive device 314 is configured with multiple signed optical fiber paths (one for each fiber of the multi-fiber array cable link) producing mutually-distinct signatures. By detecting the signatures, the OTDR unit can determine the multi-fiber array arrangement of the cable link under test 310 (e.g. Type A, B or C).

In one embodiment, the receive device 314 comprises an array of optical detectors 332 that can detect a status signal on any of multi-fiber links under test.

Other configurations are possible. For example, in one embodiment, the status signal is transmitted via a selected one of the fiber paths of the multi-fiber array cable link under test 310, as selected by the optical switch 320. The receive device 314 may then have a single optical detector 332 that detects the status signal on the selected fiber path. In other embodiments wherein a polarity of the multi-fiber array cable link under test 310 is unknown among a plurality of possible polarity configurations, the same status signal may be transmitted via all fiber paths that can end at a selected fiber position of the receive device 314 according to the possible polarity configurations. A single optical detector 332 may then be used at the receive device 314, coupled to the selected fiber position. Alternatively, the status signal is transmitted via a single fiber path and, according to the possible polarity configurations, all fiber positions at which the status signal can end are coupled to a single optical detector 332 (using, e.g., fiber couplers).

It will be understood that in embodiments of the test systems of both FIGS. 5 and 7, the OTDR unit 212/312 and the optical switch 228/320 may be together integrated in a same and unique test unit and may further be permanently interconnected optically and be controlled by a common controller embodied, e.g. by the processing unit 142.

In accordance with other embodiments described with reference to FIGS. 8 to 10, the present description also provides an OTDR receive device that is configured to receive a status signal from an OTDR unit via a wireless communication between the OTDR unit and the receive device. In such a case, the signature, which is otherwise used to detect connectivity between the OTDR unit and the receive device, can be replaced by a light detection in the OTDR receive device. The receive device confirms the presence of the OTDR unit at the opposite end of the link under test by detecting OTDR activity or other presence signal. Connectivity status is communicated between the OTDR unit and the receive device via the wireless communication.

Figure 8:
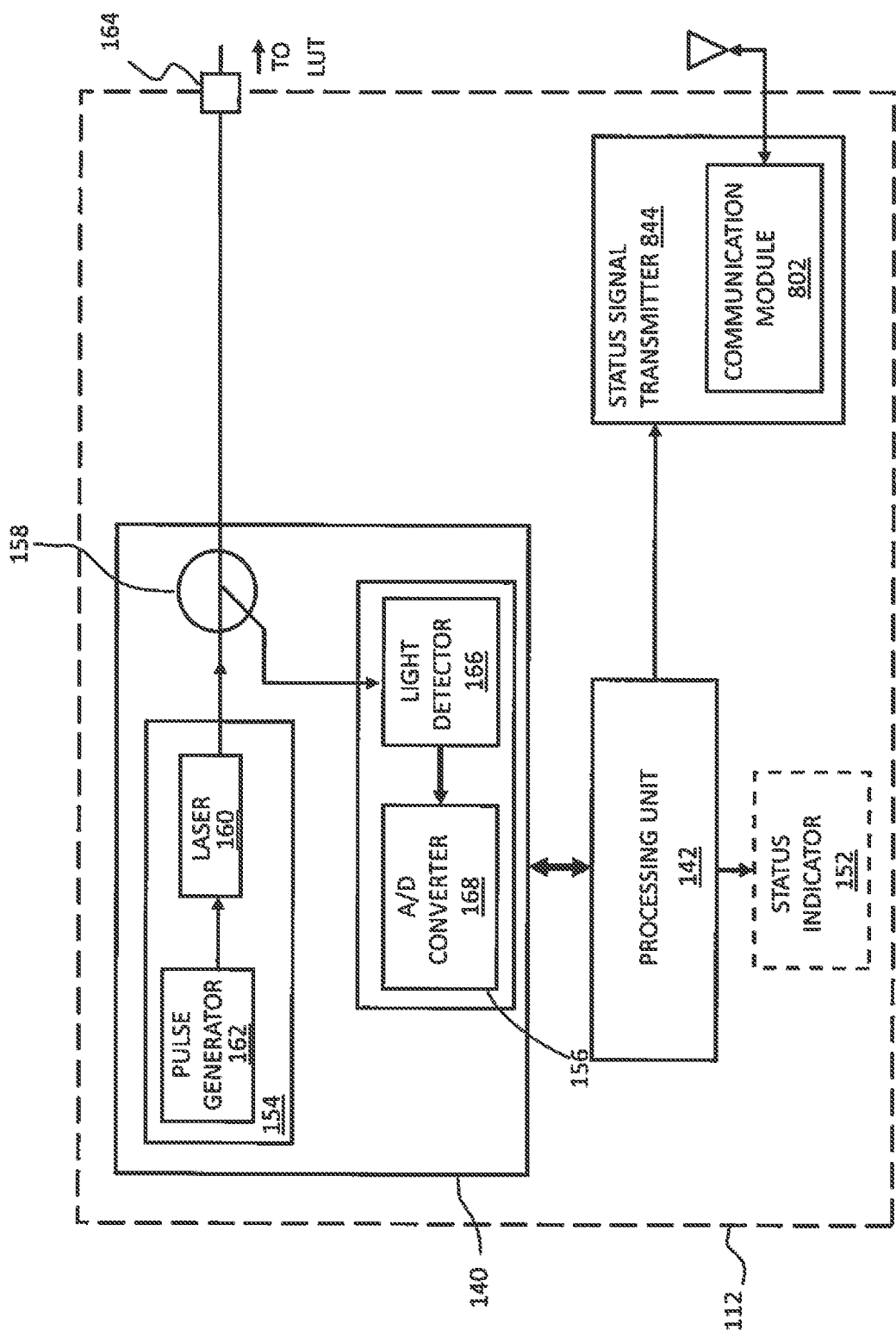
FIG. 8 is a block diagram illustrating in more details the OTDR unit of FIG. 1, in accordance with another embodiment.

FIG. 8 shows another embodiment of an OTDR unit 112 for use in the OTDR system of FIG. 1. But for the status signal transmitter 844, the OTDR unit 112 of FIG. 8 is otherwise similar to the OTDR unit 112 of FIG. 4 and like features are therefore not repeatedly described.

The OTDR unit 112 of FIG. 8 comprises a status signal transmitter 844 configured to send a status signal representative of a current status state of the OTDR unit via a wireless communication. The status signal transmitter 844 comprises a communication module 802 or radio to enable wireless communication to the receive device, e.g., directly, via a cellular network or via a cloud server. In one embodiment, the communication module 802 may be wirelessly connected to a smart phone or other portable device connected to a cellular network, via which a communication can be established between the OTDR unit 112 and the receive device 114. In another embodiment, the communication module 802 can support Internet of Things protocols such as NarrowBand Internet of Things (NB-IoT) or Long Term Evolution Machine Type Communication (LTE-M).

The communication module 802 may also optionally be used to receive a connectivity status signal or other signal(s)

from the receive device 114. FIG. 9 shows another embodiment of a receive device 114 for use with the OTDR unit 112 of FIG. 8. But for the status signal receiver 902, the receive device 114 of FIG. 9 is otherwise similar to the receive device 114 of FIG. 2 and like features are therefore not repeatedly described.

Figure 9:
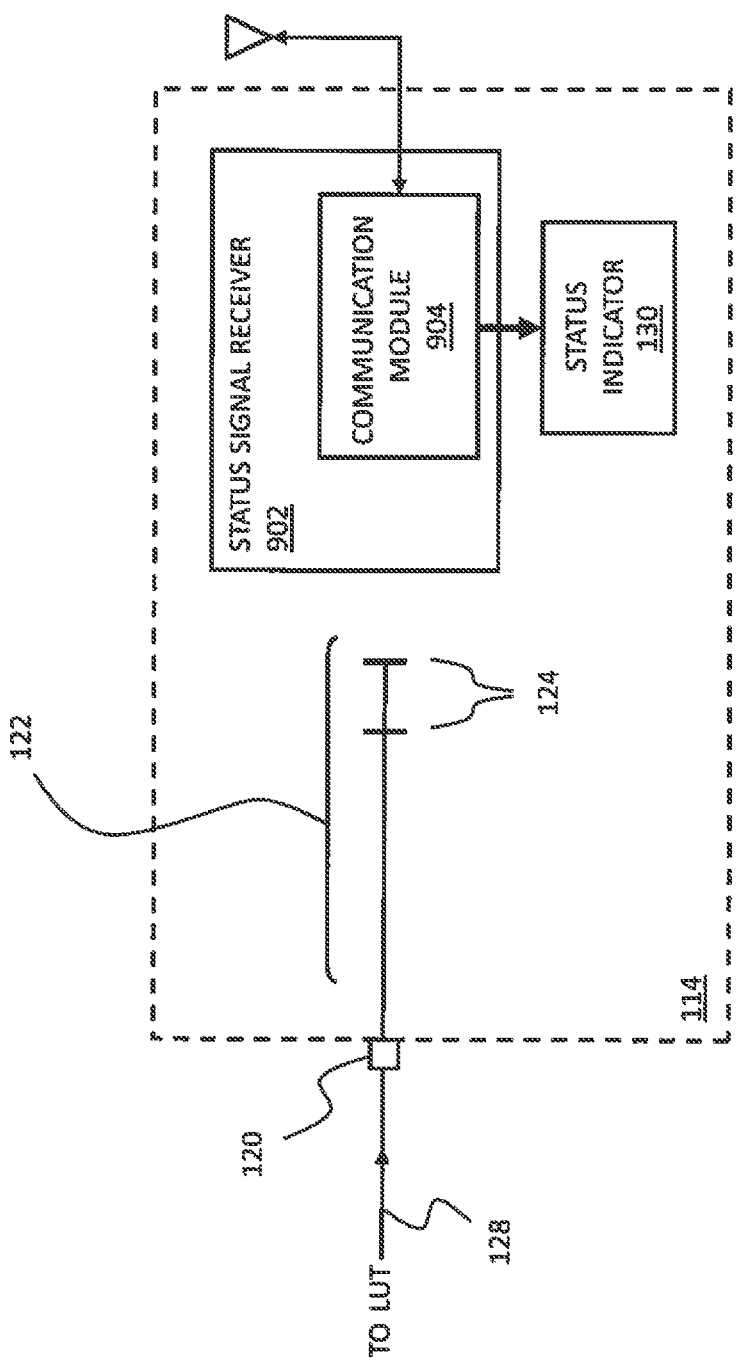
FIG. 9 is a block diagram illustrating in more details a receive device for use in the OTDR system of FIG. 1, in accordance with yet another embodiment.

The receive device 114 of FIG. 9 comprises a status signal receiver 902 configured to receive from the OTDR unit 102 a status signal representative of a current status state via a wireless communication. The status signal receiver 902 comprises a communication module 904 or radio to enable wireless communication with the OTDR unit, e.g., directly, via a cellular network or via a cloud server. In one embodiment, the communication module 904 may be wirelessly connected to a smart phone or other portable device connected to a cellular network, via which a communication can be established between the OTDR unit 112 and the receive device 114. In another embodiment, the communication module 904 can support Internet of Things protocols such as NarrowBand Internet of Things (NB-IoT) or Long Term Evolution Machine Type Communication (LTE-M).

In this embodiment, the OTDR unit 112 can determine a presence of the receive device 114 at an opposite end of the optical fiber link under test 110 by detecting the signature in the one or more OTDR acquisitions. Once a connectivity is detected by the OTDR unit 112, the current status state of the OTDR unit 112, including the detected connectivity, is sent to the receive device 114 via wireless communication and the status indicator 130 is updated accordingly.

Figure 10:
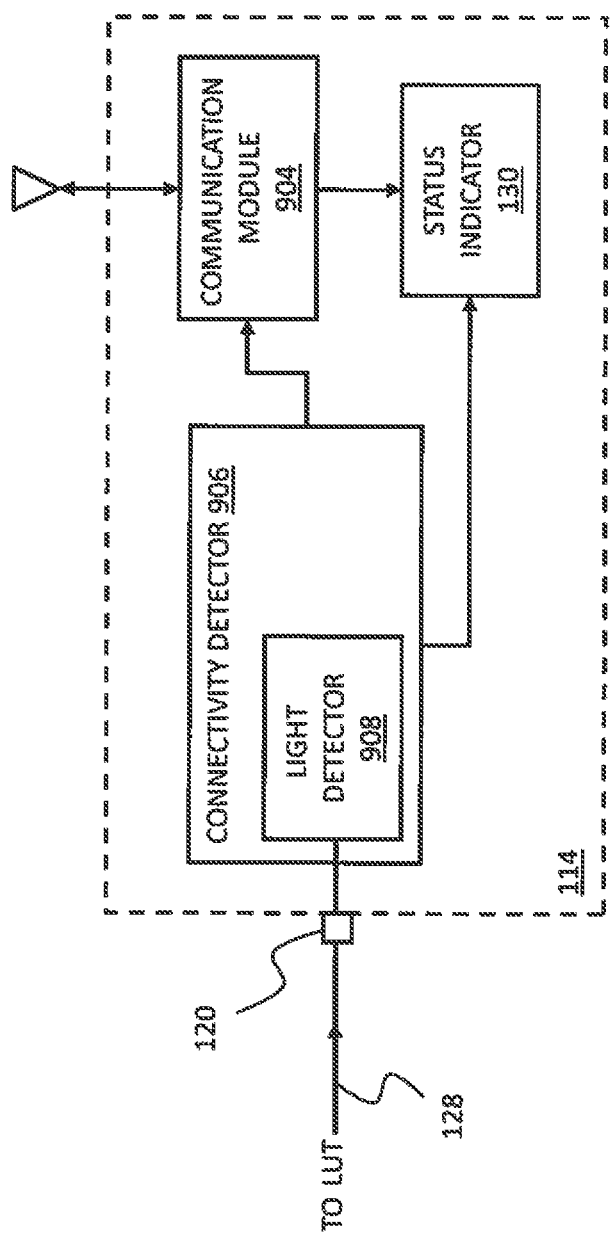
FIG. 10 is a block diagram illustrating in more details a receive device for use in the OTDR system of FIG. 1, in accordance with still another embodiment.

FIG. 10 shows yet another embodiment of a receive device 114 for use with the OTDR unit 112 of FIG. 8. In this embodiment, connectivity detection is performed solely by the receive device 114 via a connectivity detector 906. The receive device 114 comprises an input interface 120, e.g. an optical fiber connector, to connect the receive device 114 towards the link under test 110, either directly or via the receive fiber 118; a connectivity detector 906 connectable toward the link under test via the input interface 120; a communication module 904; and a status indicator 130. The connectivity detector 906 comprises a light detector 908 connected to an input interface 120 so as to detect a presence of light in the optical fiber link under test, whereas a presence of light is indicative of an established optical connectivity between the OTDR unit 102 and the receive device 104. A connectivity status generated by the connectivity detector 906 can be transmitted to the OTDR unit 102 via the communication module 904 by sending a wireless connectivity status signal. In one embodiment, the connectivity detector 906 may comprise an electronic circuit configured to distinct a generic light signal from light likely generated by the OTDR unit 102. More specifically, the connectivity detector 906 may be configured to detect OTDR-like pulsed light or otherwise encoded light in accordance with a given encoding convention used by the OTDR unit 102.

The communication module 904 is further used to receive a wireless status state signal from the OTDR unit 102, the wireless status state signal being indicative of the current status state of the OTDR unit 102.

The status indicator 130 may be used to notify the user of the receive device of either or both the connectivity status and the current status state.

Optionally, notwithstanding the status signal receiver 902, the receive device 114 of FIG. 9 may also comprise a connectivity detector 906 connected to the optical fiber path 122 in order to detect a connectivity between the OTDR unit and the receive device by detecting a presence of light in the optical fiber link under test.

Furthermore, in both embodiments of FIGS. 9 and 10, the communication module 904 may further be used to send to the OTDR unit 102 an instruction, triggered by a user of the receive device 104, for the OTDR unit 102 to launch an OTDR measurement.

It is noted that a communication module may be further included in any of the embodiments of FIGS. 2 to 7. In some embodiments, such communication module may be used to pair the OTDR unit, receive device or both to a respective smart phone or other portable device, such that the smart phone or other portable device may be considered part of the OTDR unit and/or the receive device. In such case, status indicators may be displayed on a display of such a smart phone or other portable device.

EXAMPLES

The following are example implementations of logic state machines that may be embodied using the OTDR systems described hereinabove with reference to FIGS. 1 to 9.

Figure 11:
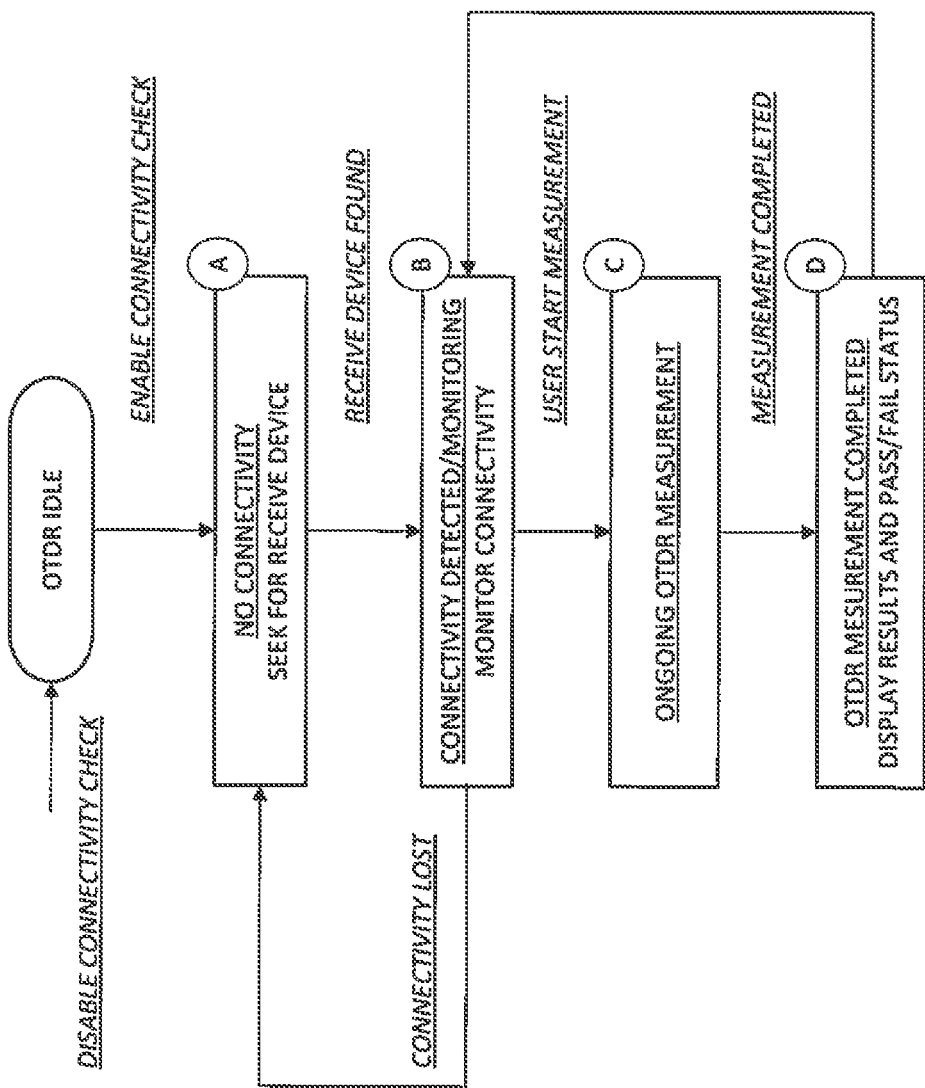
FIG. 11 is a flow chart illustrating a state machine associated with the OTDR unit of FIG. 1, 5 or 7, in accordance with one embodiment.

FIG. 11 shows a flow chart illustrating one embodiment of a logic state machine associated with the OTDR system of FIG. 1, 5 or 7. The current state of the state machine is communicated from the OTDR unit to the receive device via a status signal as described hereinabove. The state machine may run as follows:

Scenario 1a—Continuous Detection

LUT_ID=1.

A) Status State=>No Connectivity

In status state A, the OTDR unit continuously perform OTDR acquisitions to detect a presence of a receive device by detecting a signature in the acquired OTDR trace. User A connects the launch fiber and the OTDR unit to LUT1. User B connects the receive fiber and the receive device to LUT1. The OTDR unit detects presence of the receive device and, consequently, the state machine switches to state B. Optionally the receive fiber also detects a presence of the OTDR test signal and/or reads the transmitted status signal.

B) Status State=>Connectivity Detected/Monitoring

The OTDR unit and optionally the receive device notify their respective users (via their respective status indicators) of the current status state, i.e., that a connectivity is established. In this state, the OTDR unit may optionally continue to monitor the presence of the receive device, waiting for a start command. If connectivity is lost, the state machine goes back to state A. The state machine switches to state C upon user A pressing "Start" and an OTDR measurement is then launched.

C) Status State=>Ongoing OTDR Measurement

The OTDR unit and the receive device may optionally notify their respective users of the current status state, i.e., that an OTDR measurement is in progress (via their respective status indicators).

It is noted that, differentiated notifications for the established connectivity and the ongoing OTDR measurement may be optional because no action is required from user B upon an established connectivity, until the OTDR measurement is completed.

D) Status State=>OTDR Measurement Completed—PASS

At the end of the measurement process, the state machine switches to state D. The OTDR unit and the receive device notify their respective users (via their respective status indicators) with the PASS/FAIL status, which is PASS in this scenario (via their respective status indicators). Optionally, if the result is PASS, LUT_ID is incremented (LUT_ID=>2).

From the notification, both users know that they can move on to the next fiber and begin a new detection and test sequence.

B) Status State=>Connectivity Detected/Monitoring

The OTDR unit automatically returns to monitoring a presence of the receive device. User A disconnects the OTDR unit and launch fiber from LUT1. The OTDR unit detects a loss of connectivity from an acquired OTDR trace and the state machine switches to state A.

A) Status State=>No Connectivity

The OTDR unit and the receive device notify their respective users of the current status state, i.e., that a connectivity is lost. The OTDR unit starts seeking again for the receive device. User A connects the launch fiber to LUT2. User B connects the receive fiber and the receive device to LUT2. The OTDR unit detects a presence of the receive device by detecting a signature in the acquired OTDR trace, and, consequently, the state machine switches to state B.

B) Status State=>Connectivity Detected

The OTDR unit and the receive device notify their respective users of the current status state, i.e., that a connectivity is established, and so on.

Scenario 2—Scenario 1a with FAIL on Connector A.

This scenario is the same as scenario 1a but the OTDR measurement PASS/FAIL status is FAIL on the first connector of LUT1.

LUT_ID =1.

A) Status State=>No Connectivity

In status state A, the OTDR unit continuously perform OTDR acquisitions to detect a presence of a receive device by detecting a signature in the acquired OTDR trace. User A connects the OTDR unit and the launch fiber to LUT1. User A presses start on the OTDR unit. The OTDR unit starts seeking for the receive device by repeatedly launching OTDR acquisitions and analyzing the acquired OTDR trace to find a signature. User B connects the receive fiber and the receive device to LUT1. The OTDR unit detects presence of the receive device and, consequently, the state machine switches to state B. Optionally, the receive device detects a presence of the OTDR test signal and/or reads the transmitted status signal.

B) Status State=>Connectivity Detected/Monitoring

The OTDR unit and optionally the receive device notify their respective users (via their respective status indicators) of the current status state, i.e., that a connectivity is established. The state machine switches to state C upon user A pressing "Start" and an OTDR measurement is then launched.

C) Status State=>Ongoing OTDR Measurement

The OTDR unit and the receive device may optionally notify their respective users of the current status state, i.e., that an OTDR measurement is in progress (via their respective status indicators).

D) Status State=>OTDR Measurement Completed—FAIL

At the end of the measurement process, the state machine switches to state D. The OTDR unit and the receive device notify their respective users (via their respective status indicators) with the PASS/FAIL status, which is FAIL in this scenario, and optionally the source of the FAIL status is indicated, i.e. FAIL on the first connector of the LUT. Optionally, if the result is FAIL, LUT_ID is not incremented (LUT_ID=1).

From the notification, both users know that they should not move to the next fiber.

B) Status State=>Connectivity Detected/Monitoring

The OTDR unit returns to monitoring a presence of the receive device. User A disconnects the launch fiber and the OTDR unit from LUT1 in order to inspect and clean the first connector of the LUT. The OTDR unit detects a loss of connectivity from an acquired OTDR trace and the state machine switches to state A.

A) Status State=>No Connectivity

The OTDR unit and the receive device notify their respective users that connectivity is lost (via their respective status indicators). User A inspects and cleans the first connector. The OTDR unit continuously performs OTDR acquisitions to detect a presence of a receive device by detecting the corresponding signature in the acquired OTDR trace. User A connects the launch fiber and the OTDR unit back to LUT1. The receive fiber and the receive device are still connected or are reconnected to LUT1. The OTDR unit detects a presence of the receive device and the state machine switches to state B.

B) Status State=>Connectivity Detected

The OTDR unit and the receive device notify their respective users that a connectivity is established (via their respective status indicators). The state machine switches to state C upon user A pressing "Start" and an OTDR measurement is then launched.

C) Status State=>Ongoing OTDR Measurement

The OTDR unit and the receive device may optionally notify their respective users that an OTDR measurement is in progress (via their respective status indicators).

D) Status State=>OTDR Measurement Completed—PASS

At the end of the measurement process, the state machine switches to state D. The OTDR unit and the receive device notify their respective users with the PASS/FAIL status, which is now PASS. Optionally, if the result is PASS, LUT_ID is incremented (LUT_ID=>2).

Both users know that they can move on to the next fiber and begin a new detection and test sequence.

B) Status State=>Connectivity Detected/Monitoring

The OTDR unit returns to monitoring a presence of the receive device. User A disconnects the OTDR unit and launch fiber from LUT1. The OTDR unit detects a loss of connectivity from an acquired OTDR trace and the state machine switches to state A.

A) Status State=>No Connectivity

The OTDR unit and the receive device notify their respective users that a connectivity is lost. The OTDR unit starts seeking again for the receive device. User A connects the launch fiber to LUT2. User B connects the receive fiber and the receive device to LUT2. The OTDR unit detects a presence of the receive device and, consequently, the state machine switches to state B.

B) Status State=>Connectivity Detected

The OTDR unit and the receive device notify their respective users that a connectivity is established (via their respective status indicators), and so on.

Scenario 3—Scenario 1a with FAIL on Connector B

This scenario is the same as scenario 1a but the OTDR measurement PASS/FAIL status is FAIL on the LUT's end connector. Steps A, B and C are the same as in scenario 1a.

D) Status State=>OTDR Measurement Completed—FAIL

At the end of the measurement process, the state machine switches to state D. The OTDR unit notifies user A with the PASS/FAIL status, which is FAIL in this scenario, and optionally the source of the FAIL status is indicated, i.e. FAIL on the end connector of the LUT. Optionally, if the result is FAIL, LUT_ID is not incremented (LUT_ID=1). The receive device notifies user B with a FAIL status (for example a fast flashing red light indicator or a retry flashing LED).

From the notification, both users know that they should not move to the next fiber.

B) Status State=>Connectivity Detected/Monitoring

The OTDR unit returns to monitoring a presence of the receive device. User B disconnects the receive fiber and the receive device from LUT1 in order to inspect and clean the end connector of the LUT. The OTDR unit detects a loss of connectivity from an acquired OTDR trace and the state machine switches to state A.

A) Status State=>No Connectivity

The OTDR unit and the receive device notify their respective users that a connectivity is lost (via their respective status indicators). User B inspects and cleans the end connector. User B connects the receive fiber and the receive device back to the LUT1. The OTDR unit detects a presence of the receive device and the state machine switches to state B.

B) Status State=>Connectivity Detected

The OTDR unit and the receive device notify their respective users that a connectivity is established (via their respective status indicators). The state machine switches to state C upon user A pressing "Start" and an OTDR measurement is then launched.

C) Status State=>Ongoing OTDR Measurement

The OTDR unit and the receive device may optionally notify their respective users that an OTDR measurement is in progress (via their respective status indicators).

D) Status State=>OTDR Measurement Completed—PASS

At the end of the OTDR measurement process, the state machine switches to state D. The OTDR unit and the receive device notify their respective users (via their respective status indicators) with the PASS/FAIL status, which is now PASS. Optionally, if the result is PASS, LUT_ID is incremented (LUT_ID=>2), and so on.

Scenario 4—Not Connected to Same Fiber

A) Status State=>No Connectivity

The OTDR unit continuously perform OTDR acquisitions to detect a presence of a receive device by detecting the corresponding signature in the acquired OTDR trace. User A connects the launch fiber and the OTDR unit to LUT1. User B connects the receive fiber and the receive device to a different LUT by mistake. Both users are waiting for the connectivity notification. After a while, both users know that there is an issue because no connectivity notification is received. They communicate with one another to troubleshoot.

Figure 12:
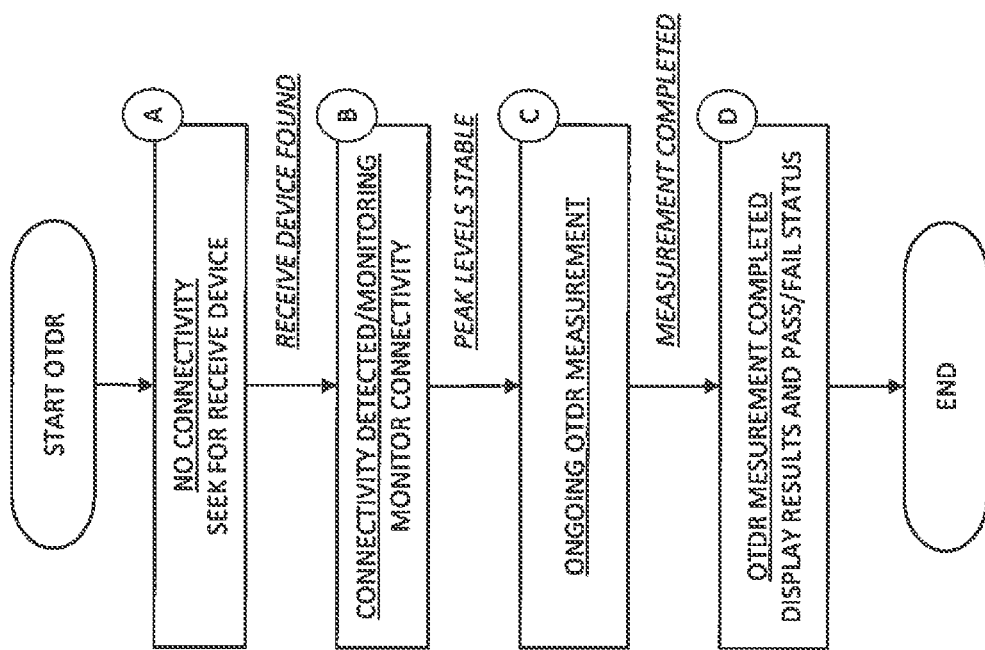
FIG. 12 is a flow chart illustrating a state machine associated with the OTDR unit of FIG. 1, 5 or 7, in accordance with another embodiment.

The state machine associated with the OTDR system may vary. FIG. 12 shows a flow chart illustrating another embodiment of a logic state machine associated with the OTDR system of FIG. 1, 5 or 7. The state machine is described as follows:

Scenario 1b—Connectivity Enabled on Start

LUT_ID=1.

User A connects the OTDR unit and the launch fiber to LUT1. User A presses start on the OTDR unit.

A) Status State=>No Connectivity

In status state A, the OTDR unit starts seeking for the receive device by repeatedly launching OTDR acquisitions and analyzing the acquired OTDR trace to find a signature. User B connects the receive fiber and the receive device to LUT1. The OTDR unit detects presence of the receive device and, consequently, the state machine switches to state B.

B) Status State=>Connectivity Detected/Monitoring

The OTDR unit and optionally the receive device notify their respective users that a connectivity is established (via their respective status indicators). The OTDR unit checks that the connection is stable by monitoring levels of signature peaks in the acquired OTDR traces and the state machine automatically switches to state C upon a stable connection.

C) Status State=>Ongoing OTDR Measurement

The OTDR unit and the receive device may optionally notify their respective users that an OTDR measurement is in progress (via their respective status indicators).

It is noted that, differentiated notifications for the established connectivity and the ongoing OTDR measurement may be optional because no action is required from both users upon an established connectivity, until the OTDR measurement is completed.

D) Status State=>OTDR Measurement Completed—PASS

At the end of the measurement process, the state machine switches to state D. The OTDR unit and the receive device notify their respective users with the PASS/FAIL status, which is PASS in this scenario. Both users know that they can move to the next fiber. The OTDR stops seeking for the receive device and the OTDR unit waits for user A to press "Start" again for a new measurement.

User A connects the OTDR unit and the launch fiber to LUT2. User A presses "Start" on the OTDR unit and, consequently, the state machine switches to state A. The OTDR unit starts seeking again for the receive device. User B connects the receive fiber and the receive device to LUT2. The OTDR unit detects a presence of the receive device, and so on.

Real Time Connectivity

There are different approaches to manage when the connectivity detection is enabled, including a) adding an ON/OFF switch on the OTDR unit to enable/disable continuous continuity check (like in the state machine of FIG. 11) and b) activating connectivity on hitting a "Start" button and deactivating it at the end of an OTDR measurement (like in the state machine of FIG. 12). The advantage of option b) is the lower power consumption. However, user B will not get a connectivity feedback if the OTDR unit is not in continuity detection mode. Constant connectivity feedback is provided with option a).

Active Receive Device

One alternative for establishing connectivity between the OTDR unit and the receive device is to include a light source in the receive device to continuously transmit a presence signal to the OTDR unit. By doing so, the OTDR does not need to perform an OTDR acquisition to detect the receive device. User B may also trigger an OTDR measurement using the receive device, which then sends a "start" signal to the OTDR unit to launch the OTDR measurement. However, a light source requires more power than a photodetector. Furthermore, such embodiments require coordination with the OTDR unit to turn off the light source during an OTDR measurement or that the OTDR signal and the active receive device use different wavelengths. Lastly, using a specific wavelength in the receive device may prevent use of such device in filtered CWDM or DWDM channels.

Example of OTDR Device Architecture

Figure 13:
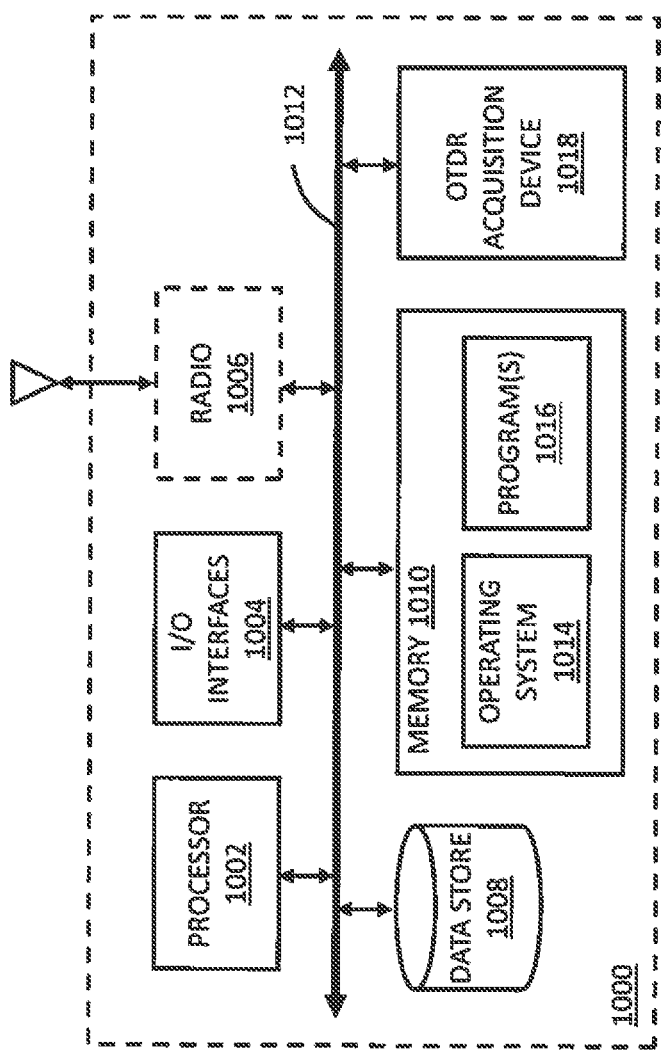
FIG. 13 is a block diagram illustrating an example architecture of an OTDR device of the system of FIG. 1.

FIG. 13 is a block diagram of an OTDR device 1000 which may embody the OTDR unit 112 of the system of FIG. 1. The OTDR device 1000 may comprise a digital device that, in terms of hardware architecture, generally includes a processor 1002, input/output (I/O) interfaces 1004, an optional radio 1006, a data store 1008, a memory 1010, as well as an optical test device including an OTDR acquisition device 1018. It should be appreciated by those of ordinary skill in the art that FIG. 10 depicts the OTDR device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the OTDR device 1000 is in operation, the processor 1002 is configured to execute software stored within the memory 1010, to communicate data to and from the memory 1010, and to generally control operations of the OTDR device 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the OTDR device 1000. For example, the I/O interfaces 1004 may embody the status indicator 152.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as OTDR traces and OTDR measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 10, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The programs 1016 may include various applications, add-ons, etc. configured to provide end-user functionality with the OTDR device 1000. For example, example programs 1016 may include a web browser to connect with a server for transferring OTDR measurement data files; a wireless communication application configured to send status state signals to the receive device 114 via, e.g., a cellular network, the internet, a cloud server or a smartphone or other portable device connected to a cellular network; a dedicated OTDR application comprising a GUI and configured to control OTDR acquisitions by the OTDR acquisition device 1018, set OTDR acquisition parameters, analyze OTDR traces obtained by the OTDR acquisition device 1018 and display a GUI related to the OTDR device 1000. For example, the dedicated OTDR application may embody an OTDR analysis module configured to analyze acquired OTDR traces in order to characterize the optical fiber link under test, and produce OTDR measurement data files.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the OTDR device 1000 via the radio 106. In such cases, at least some of the programs 1016 may be located in a memory of such a mobile device, for execution by a processor of the physically distinct device. The mobile may then also include a radio and be used to transfer OTDR measurement data files toward a remote test application residing, e.g., on a server.

It should be noted that the OTDR device shown in FIG. 13 is meant as an illustrative example only. Numerous types of computer systems are available and can be used to implement the OTDR device.

Example of OTDR Acquisition Device Architecture

Figure 14:
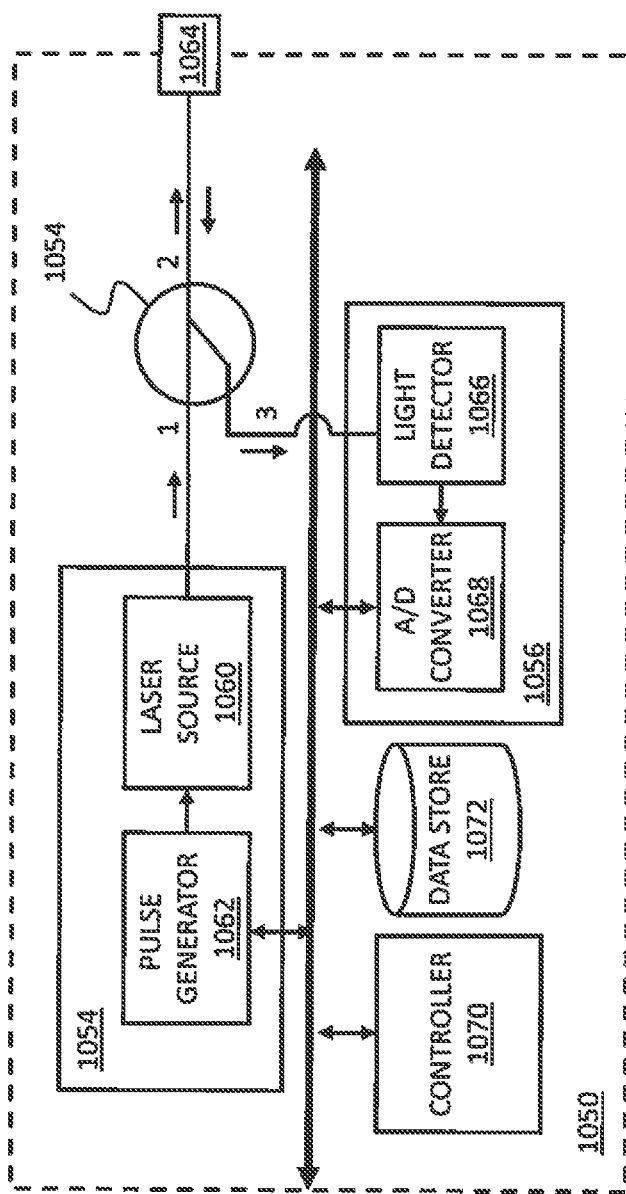
FIG. 14 is a block diagram illustrating an example architecture of an OTDR acquisition device of the OTDR device of FIG. 13.

FIG. 14 is a block diagram an embodiment of an OTDR acquisition device 1050 which may embody the OTDR acquisition device 1018 of the OTDR device 1000 of FIG. 13.

The OTDR acquisition device 1050 is connectable toward the tested optical fiber link via an output interface 1064, for performing OTDR acquisitions toward the optical fiber link. The OTDR acquisition device 1050 comprises conventional optical hardware and electronics as known in the art for performing OTDR acquisitions over an optical fiber link.

The OTDR acquisition device 1050 comprises a light generating assembly 1054, a detection assembly 1056, a directional coupler 1058, as well as a controller 1070 and a data store 1072.

The light generating assembly 1054 is embodied by a laser source 1060 driven by a pulse generator 1062 to generate the OTDR test signal comprising test light pulses having desired characteristics. As known in the art, the light generating assembly 1054 is adapted to generate test light pulses of varied pulse widths, repetition periods and optical power through a proper control of the pattern produced by the pulse generator 1062. One skilled in the art will understand that it may be beneficial or required by the application to perform OTDR measurements at various different wavelengths. For this purpose, in some embodiments, the light generating assembly 1054 is adapted to generate test light pulses having varied wavelengths by employing a laser source 1060 that is tunable for example. It will be understood that the light generating assembly 1054 may combine both pulse width and wavelength control capabilities. Of course, different and/or additional components may be provided in the light generating assembly, such as modulators, lenses, mirrors, optical filters, wavelength selectors and the like.

The light generating assembly 1054 is coupled to the output interface 1064 of the OTDR acquisition device 1050 through a directional coupler 1058, such as a circulator, having three or more ports. The first port is connected to the light generating assembly 1054 to receive the test light pulses therefrom. The second port is connected toward the output interface 1064. The third port is connected to the detection assembly 1056. The connections are such that test light pulses generated by the light generating assembly 1054 are coupled to the output interface 1064 and that the return light signal arising from backscattering and reflections along the optical fiber link 110 is coupled to the detection assembly 1056.

The detection assembly 1056 comprises a light detector 1066, such as a photodiode, an avalanche photodiode or any other suitable photodetector, which detects the return light signal corresponding to each test light pulse, and an analog to digital converter 1068 to convert the electrical signal proportional to the detected return light signal from analog to digital in order to allow data storage and processing. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace.

Of course, the OTDR acquisition device 1050 may also be used to perform multiple acquisitions with varied pulse widths to obtain a multi-pulsewidth OTDR measurement.

The OTDR acquisition device 1050, and more specifically the light generating assembly 1054 is controlled by the controller 1070. The controller 1070 is a hardware logic device. It may comprise one or more Field Programmable Gate Array (FPGA); one or more Application Specific Integrated Circuits (ASICs) or one or more processors, configured with a logic state machine or stored program instructions. When the OTDR acquisition device 1050 is in operation, the controller 1070 is configured to control the OTDR measurement process. The controller 1070 controls parameters of the light generating assembly 1054 according to OTDR acquisition parameters that are either provided by the operator of the OTDR software or otherwise determined by program(s) 1016.

The data store 1072 may be used to cumulate raw data received from the detection assembly 1056, as well as intermediary averaged results and resulting OTDR traces. The data store 908 may include any of volatile memory elements (e.g., random access memory (RAM, such as DRAM, SRAM, SDRAM, and the like)) or the like and it may be embedded with the controller 1070 or distinct.

The OTDR traces acquired by the OTDR acquisition device 1050 may be received and analyzed by one or more of the computer programs 916 or 816 and/or stored in data store 908 for further processing.

It should be noted that the architecture of the OTDR acquisition device 1050 as shown in FIG. 14 is meant as an illustrative example only. Numerous types of optical and electronic components are available and can be used to implement the OTDR acquisition device.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The embodiments described above are intended to be exemplary only. The scope of the invention is therefore intended to be limited solely by the appended claims.

The invention claimed is:

1. A receive device to be used with an Optical Time-Domain Reflectometer (OTDR) unit when the OTDR unit and the receive device are connected toward opposite ends of an optical fiber link under test, the receive device comprising:
a light source connectable toward the optical fiber link under test to transmit a presence signal that is detectable by the OTDR unit;
a status detector coupled to the optical fiber link under test to receive, from the OTDR unit, a status signal propagating along the optical fiber link under test and determine a current status state therefrom; and
a status indicator to notify a user of the receive device of the determined current status state.

2. The receive device as claimed in claim 1, wherein said light source is configured to send the presence signal in the form of a response signal upon receiving a ping request from the OTDR unit.

3. The receive device as claimed in claim 1, wherein said light source is configured to send a start signal to the OTDR unit to launch an OTDR measurement upon request by the user.

4. The receive device as claimed in claim 1, wherein the current status state is one among a group of possible status states comprising: a) an OTDR measurement is ongoing; and b) an OTDR measurement is completed.

5. The receive device as claimed in claim 1, wherein the current status state is one among a group of possible status states comprising: a) an OTDR measurement is ongoing; b) an OTDR measurement is completed and c) no connectivity.

6. The receive device as claimed in claim 1, wherein the status signal comprises OTDR test light pulses when a current status state comprises a) an OTDR measurement is ongoing.

7. The receive device as claimed in claim 1, wherein the receive device comprises a battery level indicator.

8. The receive device as claimed in claim 1, wherein the current status state further indicates a test result status.

9. The receive device as claimed in claim 8, wherein the current status state is one among a group of possible status states comprising: a) an OTDR measurement is ongoing; b) OTDR measurement is completed and results are PASS; and c) OTDR measurement is completed and results are FAIL.

10. The receive device as claimed in claim 8, wherein the status indicator comprises a set of light emitting diodes (LEDs).

11. An OTDR system comprising:
an OTDR unit to be connected to one end of an optical fiber link under test and comprising:
an OTDR acquisition device connectable toward an end of an optical fiber link under test for performing one or more OTDR acquisitions toward the optical fiber link;
a processing unit configured to analyze the one or more OTDR acquisitions; and
a status state transmitter configured to send a status signal representative of a current status state; and
a receive device to be connected to the other end of the optical fiber link under test and comprising:
a light source connectable toward the optical fiber link under test to transmit a presence signal that is detectable by the OTDR unit; and
a status indicator to notify a user of the receive device of the current status state received from the OTDR unit;
wherein the OTDR unit is configured to detect a presence of the receive device at an opposite end of the optical fiber link under test by detecting the presence signal.

12. The OTDR system as claimed in claim 11, wherein said light source is configured to send the presence signal in the form of a response signal upon receiving a ping request from the OTDR unit.

13. The OTDR system as claimed in claim 11, wherein said light source is configured to send a start signal to the OTDR unit to launch an OTDR measurement upon request by the user.

14. The OTDR system as claimed in claim 11,
wherein the status state transmitter comprises a light signal generator configured to send a status signal representative of a current status state via the optical fiber link under test; and
wherein the receive device further comprises a status detector coupled to the optical fiber path to receive a status signal propagating along the optical fiber link under test and determine the current status state therefrom.

15. The OTDR system as claimed in claim 11, wherein the OTDR unit comprises a status indicator to notify a user of the OTDR unit of the current status state.

16. The OTDR system as claimed in claim 11, wherein the current status state is one among a group of possible status states comprising: a) an OTDR measurement is ongoing; b) an OTDR measurement is completed and c) no connectivity.

17. The OTDR system as claimed in claim 11, wherein the status signal comprises OTDR test light pulses when a current status state comprises a) an OTDR measurement is ongoing.

18. The OTDR system as claimed in claim 11, wherein the current status state further indicates a test result status.

* * * * *